(12) United States Patent
Ozone et al.

(10) Patent No.: US 12,549,867 B2
(45) Date of Patent: Feb. 10, 2026

(54) IMAGING DEVICE AND IMAGE PROCESSING METHOD

(71) Applicant: SONY SEMICONDUCTOR SOLUTIONS CORPORATION, Kanagawa (JP)

(72) Inventors: Takayoshi Ozone, Kanagawa (JP); Ikki Hara, Kanagawa (JP); Junichi Sakamoto, Kanagawa (JP); Shinya Sumikura, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 165 days.

(21) Appl. No.: 18/260,259

(22) PCT Filed: Jan. 5, 2022

(86) PCT No.: PCT/JP2022/000103
§ 371 (c)(1),
(2) Date: Jul. 3, 2023

(87) PCT Pub. No.: WO2022/153896
PCT Pub. Date: Jul. 21, 2022

(65) Prior Publication Data
US 2024/0056694 A1    Feb. 15, 2024

(30) Foreign Application Priority Data
Jan. 12, 2021   (JP) .................................. 2021-002821

(51) Int. Cl.
*H04N 25/46* (2023.01)
*G02B 7/28* (2021.01)
(Continued)

(52) U.S. Cl.
CPC ............... *H04N 25/46* (2023.01); *G02B 7/28* (2013.01); *G03B 15/00* (2013.01); *H04N 23/672* (2023.01);
(Continued)

(58) Field of Classification Search
CPC ...... H04N 23/672; H04N 23/80; H04N 25/40; H04N 25/42; H04N 25/44; H04N 25/443;
(Continued)

(56) References Cited

U.S. PATENT DOCUMENTS

| | | | |
|---|---|---|---|
| 2019/0124277 A1* | 4/2019 | Mabuchi | ................ G03B 17/02 |
| 2019/0158732 A1* | 5/2019 | Shimauchi | ............ G06T 3/4023 |
| 2021/0297589 A1* | 9/2021 | Tadano | ................ H04N 25/704 |

FOREIGN PATENT DOCUMENTS

| | | |
|---|---|---|
| JP | 2008-172441 A | 7/2008 |
| JP | 2010-073074 A | 4/2010 |

(Continued)

OTHER PUBLICATIONS

International Search Report and Written Opinion of PCT Application No. PCT/JP2022/000103, issued on Mar. 29, 2022, 10 pages of ISRWO.

*Primary Examiner* — Lin Ye
*Assistant Examiner* — Chriss S Yoder, III
(74) *Attorney, Agent, or Firm* — CHIP LAW GROUP

(57) ABSTRACT

Provided is an imaging device that includes a determination unit that determines two or more regions including first and second regions with respect to an imaging region of an imaging unit on the basis of a degree of focus of an image acquired by the imaging unit. The imaging device further includes a processing unit that generates a first image based on the first region and a second image based on the second region, in which the first image has a higher resolution than the second image.

17 Claims, 18 Drawing Sheets

(51) Int. Cl.
*G03B 15/00* (2021.01)
*H04N 23/67* (2023.01)
*H04N 23/80* (2023.01)
*H04N 25/40* (2023.01)
*H04N 25/42* (2023.01)
*H04N 25/44* (2023.01)
*H04N 25/443* (2023.01)
*H04N 25/704* (2023.01)

(52) U.S. Cl.
CPC ............. *H04N 23/80* (2023.01); *H04N 25/40* (2023.01); *H04N 25/42* (2023.01); *H04N 25/44* (2023.01); *H04N 25/443* (2023.01); *H04N 25/704* (2023.01)

(58) Field of Classification Search
CPC ........ H04N 25/46; H04N 25/704; G02B 7/28; G03B 15/00
See application file for complete search history.

(56) References Cited

FOREIGN PATENT DOCUMENTS

| | | |
|---|---|---|
| JP | 2018-098613 A | 6/2018 |
| WO | 2017/187811 A1 | 11/2017 |
| WO | 2018/003502 A1 | 1/2018 |

\* cited by examiner

IMAGING DEVICE AND IMAGE PROCESSING METHOD

CROSS REFERENCE TO RELATED APPLICATIONS

This application is a U.S. National Phase of International Patent Application No. PCT/JP2022/000103 filed on Jan. 5, 2022, which claims priority benefit of Japanese Patent Application No. JP 2021-002821 filed in the Japan Patent Office on Jan. 12, 2021. Each of the above-referenced applications is hereby incorporated herein by reference in its entirety.

FIELD

The present disclosure relates to an imaging device, an image processing method, and an image processing program.

BACKGROUND

In recent years, with the autonomy of mobile bodies such as automobiles and robots and the spread of Internet of Things (IoT) and the like, it is strongly desired to increase the speed and accuracy of image recognition.

CITATION LIST

Patent Literature

Patent Literature 1: JP 2008-172441 A

SUMMARY

Technical Problem

In recent years, an amount of image data has dramatically increased with the increase in resolution of imaging devices. As a result, an amount of data to be processed in image recognition and an amount of data to be transferred from an imaging device to a recognition device and the like increase, which causes problems such as an increase in cost and an increase in processing time.

Therefore, the present disclosure proposes an imaging device, an image processing method, and an image processing program capable of reducing the amount of data.

Solution to Problem

To solve the problems described above, an imaging device according to an embodiment of the present disclosure includes: a determination unit that determines two or more regions including a first region and a second region with respect to an imaging region of an imaging unit based on a degree of focus of an image acquired by the imaging unit; and a processing unit that generates a first image based on the first region and a second image based on the second region, wherein the first image has a higher resolution than the second image.

DESCRIPTION OF EMBODIMENTS

Hereinafter, embodiments of the present disclosure will be described in detail with reference to the drawings. Note that, in each of the following embodiments, the same parts are denoted by the same reference signs, and redundant description will be omitted.

Furthermore, the present disclosure will be described according to the following item order.

0. Introduction
1. One embodiment
   1.1 Configuration example of vehicle control system
   1.2 Configuration example of solid-state imaging device (image sensor)
   1.3 Reduction in data amount
   1.4 Schematic configuration example of image processing device
   1.4.1 When ROI is determined outside chip
   1.4.2 When ROI is determined in chip
   1.5 Determination of ROI using image plane phase difference
   1.6 Generation of frame data in case of using image plane phase difference
   1.6.1 Method of binning on pixel
   1.6.2 Method of binning by calculation
   1.7 In-focus position when image plane phase difference is used
   1.8 ROI determination method when image plane phase difference is used
   1.8.1 First modification example of ROI determination method
   1.8.2 Second modification example of ROI determination method
   1.9 Estimation of vanishing point and motion vector estimation (ME)
   1.10 Summary
2. Hardware configuration 0. Introduction In an image sensor mounted on a mobile body such as an in-vehicle camera, in order to improve recognition accuracy for a farther object, a number of pixels for the purpose of high resolution is being increased. However, the increase in a data amount of the image due to the increase in the number of pixels increases the time from imaging to recognition. Furthermore, in recognition processing, an object present at a short distance is not required to have a resolution as high as that of an object present at a long distance. Moreover, an image size as a processing unit is fixed depending on a recognition device, and redundant processing of downsampling image data to reduce the size occurs when an image having a size larger than the fixed image size is processed. As described above, acquiring the entire image at a high resolution required for a long-distance object is redundant for a short-distance object, which causes an increase in cost and an increase in processing time.

Therefore, in the following embodiment, an imaging device, an image processing method, and an image processing program capable of reducing the amount of data are proposed.

1. One Embodiment

Hereinafter, an embodiment according to the present disclosure will be described in detail with reference to the drawings.

1.1 Configuration Example of Vehicle Control System

Figure 1:
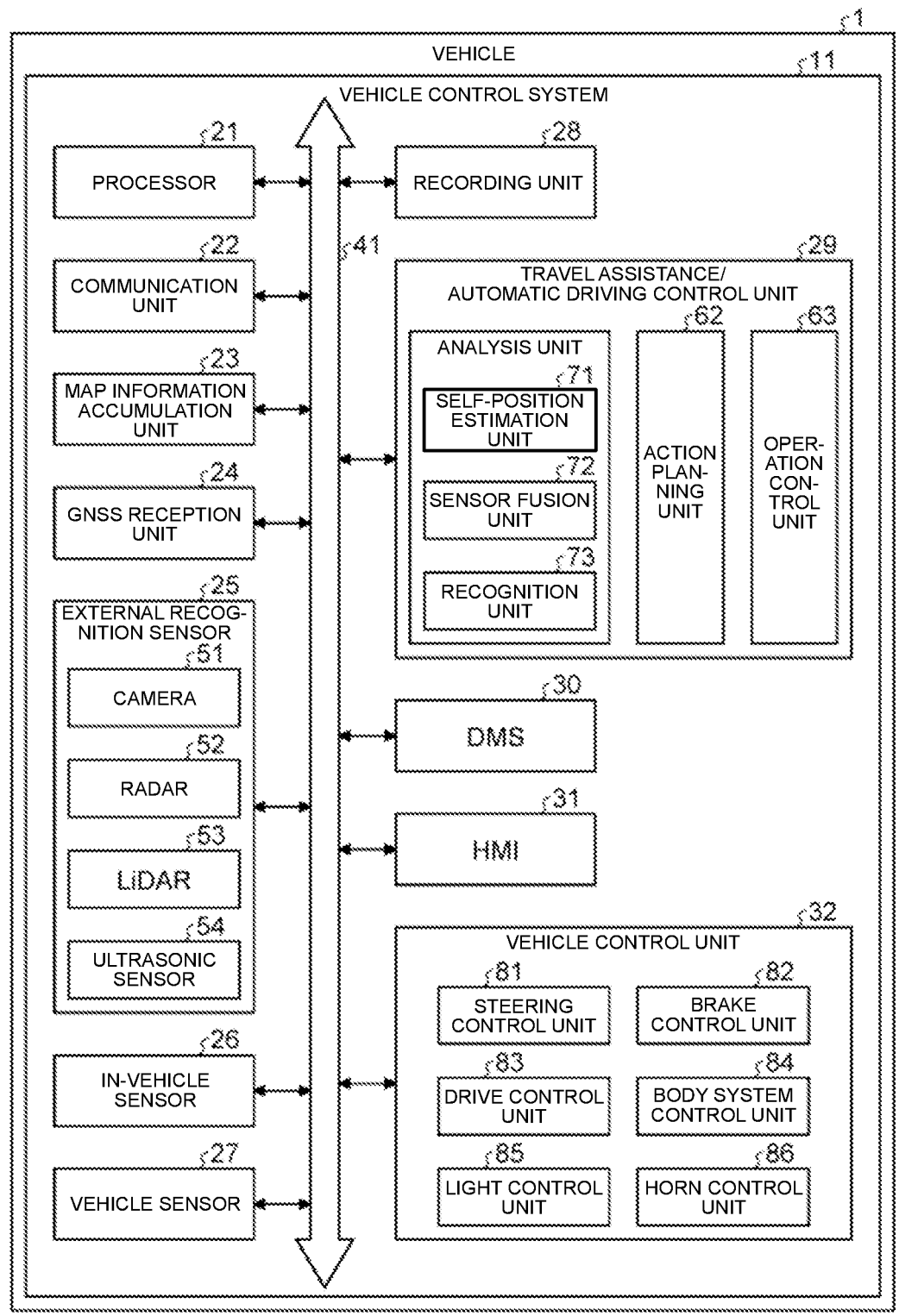
FIG. 1 is a block diagram illustrating a configuration example of a vehicle control system.

First, a mobile device control system according to the present embodiment will be described. FIG. 1 is a block diagram illustrating a configuration example of a vehicle control system 11 which is an example of a mobile device control system according to the present embodiment.

The vehicle control system 11 is provided in a vehicle 1 and performs processing related to travel assistance and automatic driving of the vehicle 1.

The vehicle control system 11 includes a vehicle control electronic control unit (ECU) 21, a communication unit 22, a map information accumulation unit 23, a global navigation satellite system (GNSS) reception unit 24, an external recognition sensor 25, an in-vehicle sensor 26, a vehicle sensor 27, a recording unit 28, a travel assistance/automatic driving control unit 29, a driver monitoring system (DMS) 30, a human machine interface (HMI) 31, and a vehicle control unit 32.

The vehicle control ECU 21, the communication unit 22, the map information accumulation unit 23, the GNSS reception unit 24, the external recognition sensor 25, the in-vehicle sensor 26, the vehicle sensor 27, the recording unit 28, the travel assistance/automatic driving control unit 29, the DMS 30, the HMI 31, and the vehicle control unit 32 are communicably connected to each other via a communication network 41. The communication network 41 includes, for example, an in-vehicle communication network, a bus, or the like conforming to a digital bidirectional communication standard such as a controller area network (CAN), a local interconnect network (LIN), a local area network (LAN), FlexRay (registered trademark), or Ethernet (registered trademark). The communication network 41 may be selectively used depending on the type of data to be communicated. For example, CAN is applied to data related to vehicle control, and Ethernet is applied to large-capacity data. Note that each unit of the vehicle control system 11 may be directly connected not via the communication network 41 but by using wireless communication that assumes communication at a relatively short distance, such as near field communication (NFC) or Bluetooth (registered trademark).

Note that, hereinafter, in a case where each unit of the vehicle control system 11 performs communication via the communication network 41, description of the communication network 41 will be omitted. For example, in a case where the vehicle control ECU 21 and the communication unit 22 perform communication via the communication network 41, it is simply described that the processor 21 and the communication unit 22 perform communication.

The vehicle control ECU 21 includes, for example, various processors such as a central processing unit (CPU) and a micro processing unit (MPU). The vehicle control ECU 21 controls the entire or partial function of the vehicle control system 11.

The communication unit 22 communicates with various devices inside and outside the vehicle, other vehicles, servers, base stations, and the like, and transmits and receives various data. At this time, the communication unit 22 can perform communication using a plurality of communication schemes.

Communication with the outside of the vehicle executable by the communication unit 22 will be schematically described. The communication unit 22 communicates with a server (Hereinafter, the server is referred to as an external server.) or the like existing on an external network via a base station or an access point by a wireless communication method such as 5th generation mobile communication system (5G), long term evolution (LTE), or dedicated short range communications (DSRC). The external network with which the communication unit 22 performs communication is, for example, the Internet, a cloud network, a network unique to a company, or the like. The communication method by which the communication unit 22 communicates with the external network is not particularly limited as long as it is a wireless communication method capable of performing digital bidirectional communication at a communication speed higher than or equal to a predetermined speed and at a distance longer than or equal to a predetermined distance.

Furthermore, for example, the communication unit 22 can communicate with a terminal existing in the vicinity of the host vehicle using a peer to peer (P2P) technology. The terminal present in the vicinity of the host vehicle is, for example, a terminal worn by a mobile body moving at a relatively low speed such as a pedestrian or a bicycle, a terminal installed in a store or the like with a position fixed, or a machine type communication (MTC) terminal. Moreover, the communication unit 22 can also perform V2X communication. The V2X communication refers to, for example, communication between the own vehicle and another vehicle, such as vehicle to vehicle communication with another vehicle, vehicle to infrastructure communication with a roadside device or the like, vehicle to home communication, and vehicle to pedestrian communication with a terminal or the like possessed by a pedestrian.

For example, the communication unit 22 can receive a program for updating software for controlling an operation of the vehicle control system 11 from the outside (Over The Air). The communication unit 22 can further receive map information, traffic information, information around the vehicle 1, and the like from the outside. Furthermore, for example, the communication unit 22 can transmit information regarding the vehicle 1, information around the vehicle 1, and the like to the outside. Examples of the information on the vehicle 1 transmitted to the outside by the communication unit 22 include data indicating the state of the vehicle 1, a recognition result by a recognition unit 73, and the like. Furthermore, for example, the communication unit 22 performs communication corresponding to a vehicle emergency call system such as an eCall.

Communication with the inside of the vehicle executable by the communication unit 22 will be schematically described. The communication unit 22 can communicate with each device in the vehicle using, for example, wireless communication. The communication unit 22 can perform wireless communication with an in-vehicle device by a communication method capable of performing digital bidirectional communication at a predetermined communication speed or higher by wireless communication, such as wireless LAN, Bluetooth, NFC, or wireless USB (WUSB). The present invention is not limited thereto, and the communication unit 22 can also communicate with each device in the vehicle using wired communication. For example, the communication unit 22 can communicate with each device in the vehicle by wired communication via a cable connected to a connection terminal (not illustrated). The communication unit 22 can communicate with each device in the vehicle by a communication method capable of performing digital bidirectional communication at a predetermined communication speed or higher by wired communication, such as universal serial bus (USB), high-definition multimedia interface (HDMI (registered trademark)), or mobile high-definition link (MHL).

Here, the in-vehicle device refers to, for example, a device that is not connected to the communication network 41 in the vehicle. As the in-vehicle device, for example, a mobile device or a wearable device carried by a passenger such as a driver, an information device brought into the vehicle and temporarily installed, or the like is assumed.

For example, the communication unit 22 receives an electromagnetic wave transmitted by a road traffic information communication system (vehicle information and communication system (VICS®)) such as a radio wave beacon, an optical beacon, or FM multiplex broadcasting.

The map information accumulation unit 23 accumulates one or both of a map acquired from the outside and a map created by the vehicle 1. For example, the map information accumulation unit 23 accumulates a three-dimensional high-precision map, a global map having lower accuracy than the high-precision map and covering a wide area, and the like.

The high-precision map is, for example, a dynamic map, a point cloud map, a vector map, or the like. The dynamic map is, for example, a map including four layers of dynamic information, semi-dynamic information, semi-static information, and static information, and is provided to the vehicle 1 from an external server or the like. The point cloud map is a map including point clouds (point cloud data). Here, the vector map indicates a map adapted to an advanced driver assistance system (ADAS) in which traffic information such as a lane and a signal position is associated with a point cloud map.

The point cloud map and the vector map may be provided from, for example, an external server or the like, or may be created by the vehicle 1 as a map for performing matching with a local map to be described later on the basis of a sensing result by a radar 52, the LiDAR 53, or the like, and may be accumulated in the map information accumulation unit 23. Furthermore, in a case where the high-precision map is provided from an external server or the like, for example, map data of several hundred meters square regarding a planned route on which the vehicle 1 travels from now is acquired from an external server or the like in order to reduce the communication capacity.

The GNSS reception unit 24 receives a GNSS signal from a GNSS satellite and acquires position information of the vehicle 1. The received GNSS signal is supplied to the travel assistance/automatic driving control unit 29. Note that the GNSS reception unit 24 is not limited to the method using the GNSS signal, and may acquire the position information using, for example, a beacon.

The external recognition sensor 25 includes various sensors used for recognizing a situation outside the vehicle 1, and supplies sensor data from each sensor to each unit of the vehicle control system 11. The type and number of sensors included in the external recognition sensor 25 are arbitrary.

For example, the external recognition sensor 25 includes a camera 51, a radar 52, a light detection and ranging or laser imaging detection and ranging (LiDAR) 53, and an ultrasonic sensor 54. The present invention is not limited thereto, and the external recognition sensor 25 may be configured to include one or more types of sensors among the camera 51, the radar 52, the LiDAR 53, and the ultrasonic sensor 54. The numbers of the cameras 51, the radars 52, the LiDAR 53, and the ultrasonic sensors 54 are not particularly limited as long as they can be practically installed in the vehicle 1. Furthermore, the type of sensor included in the external recognition sensor 25 is not limited to this example, and the external recognition sensor 25 may include another type of sensor. An example of a sensing region of each sensor included in the external recognition sensor 25 will be described later.

Note that an image capturing method of the camera 51 is not particularly limited as long as it is an image capturing method capable of distance measurement. For example, as the camera 51, cameras of various image capturing methods such as a time of flight (ToF) camera, a stereo camera, a monocular camera, and an infrared camera can be applied as necessary. The present invention is not limited thereto, and the camera 51 may simply acquire a captured image regardless of distance measurement.

Furthermore, for example, the external recognition sensor 25 can include an environment sensor for detecting the environment for the vehicle 1. The environment sensor is a sensor for detecting an environment such as weather, climate, and brightness, and can include various sensors such as a raindrop sensor, a fog sensor, a sunshine sensor, a snow sensor, and an illuminance sensor.

Moreover, for example, the external recognition sensor 25 includes a microphone used for detecting a sound around the vehicle 1, a position of a sound source, and the like.

The in-vehicle sensor 26 includes various sensors for detecting information inside the vehicle, and supplies sensor data from each sensor to each unit of the vehicle control system 11. The types and the number of various sensors included in the in-vehicle sensor 26 are not particularly limited as long as they can be practically installed in the vehicle 1.

For example, the in-vehicle sensor 26 can include one or more sensors of a camera, a radar, a seating sensor, a steering wheel sensor, a microphone, and a biological sensor. As the camera included in the in-vehicle sensor 26, for example, cameras of various image capturing methods capable of measuring a distance, such as a ToF camera, a stereo camera, a monocular camera, and an infrared camera, can be used. The present invention is not limited thereto, and the camera included in the in-vehicle sensor 26 may simply acquire a captured image regardless of distance measurement. The biological sensor included in the in-vehicle sensor 26 is provided in, for example, a seat, a steering wheel, or the like, and detects various types of biological information of an occupant such as a driver.

The vehicle sensor 27 includes various sensors for detecting the state of the vehicle 1, and supplies sensor data from each sensor to each unit of the vehicle control system 11. The types and the number of various sensors included in the vehicle sensor 27 are not particularly limited as long as they can be practically installed in the vehicle 1.

For example, the vehicle sensor 27 includes a speed sensor, an acceleration sensor, an angular velocity sensor (gyro sensor), and an inertial measurement unit (IMU) integrating these sensors. For example, the vehicle sensor 27 includes a steering angle sensor that detects a steering angle of a steering wheel, a yaw rate sensor, an accelerator sensor that detects an operation amount of an accelerator pedal, and a brake sensor that detects an operation amount of a brake pedal. For example, the vehicle sensor 27 includes a rotation sensor that detects a rotation speed of the engine or the motor, an air pressure sensor that detects an air pressure of the tire, a slip rate sensor that detects a slip rate of the tire, and a wheel speed sensor that detects a rotation speed of the wheel. For example, the vehicle sensor 27 includes a battery sensor that detects a remaining amount and temperature of the battery, and an impact sensor that detects an external impact.

The recording unit 28 includes at least one of a nonvolatile storage medium and a volatile storage medium, and stores data and a program. The recording unit 28 is used as, for example, an electrically erasable programmable read only memory (EEPROM) and a random access memory (RAM), and a magnetic storage device such as a hard disc drive (HDD), a semiconductor storage device, an optical storage device, and a magneto-optical storage device can be applied as a storage medium. The recording unit 28 records various programs and data used by each unit of the vehicle control system 11. For example, the recording unit 28 includes an event data recorder (EDR) and a data storage system for automated driving (DSSAD), and records information of the vehicle 1 before and after an event such as an accident and biological information acquired by the in-vehicle sensor 26.

The travel assistance/automatic driving control unit 29 controls travel assistance and automatic driving of the vehicle 1. For example, the travel assistance/automatic driving control unit 29 includes an analysis unit 61, an action planning unit 62, and an operation control unit 63.

The analysis unit 61 performs analysis processing of the situation of the vehicle 1 and the surroundings. The analysis unit 61 includes a self-position estimation unit 71, a sensor fusion unit 72, and the recognition unit 73.

The self-position estimation unit 71 estimates a self-position of the vehicle 1 on the basis of the sensor data from the external recognition sensor 25 and the high-precision map accumulated in the map information accumulation unit 23. For example, the self-position estimation unit 71 generates a local map on the basis of sensor data from the external recognition sensor 25, and estimates the self-position of the vehicle 1 by matching the local map with the high-precision map. A position of the vehicle 1 is based on, for example, a center of the rear wheel pair axle.

The local map is, for example, a three-dimensional high-precision map created using a technique such as simultaneous localization and mapping (SLAM), an occupancy grid map, or the like. The three-dimensional high-precision map is, for example, the above-described point cloud map or the like. The occupancy grid map is a map in which a three-dimensional or two-dimensional space around the vehicle 1 is divided into grids of a predetermined size, and an occupancy state of an object is indicated in units of grids. The occupancy state of the object is indicated by, for example, the presence or absence or existence probability of the object. The local map is also used for detection processing and recognition processing of a situation outside the vehicle 1 by the recognition unit 73, for example.

Note that the self-position estimation unit 71 may estimate the self-position of the vehicle 1 on the basis of the GNSS signal and the sensor data from the vehicle sensor 27.

The sensor fusion unit 72 performs sensor fusion processing of combining a plurality of different types of sensor data (for example, image data supplied from the camera 51 and sensor data supplied from the radar 52) to obtain new information. Methods for combining different types of sensor data include integration, fusion, association, and the like.

The recognition unit 73 executes detection processing for detecting a situation outside the vehicle 1 and recognition processing for recognizing a situation outside the vehicle 1.

For example, the recognition unit 73 performs detection processing and recognition processing of a situation outside the vehicle 1 on the basis of information from the external recognition sensor 25, information from the self-position estimation unit 71, information from the sensor fusion unit 72, and the like.

Specifically, for example, the recognition unit 73 performs detection processing, recognition processing, and the like of an object around the vehicle 1. The detection processing of an object is, for example, processing of detecting the presence or absence, size, shape, position, movement, and the like of the object. The recognition processing of an object is, for example, processing of recognizing an attribute such as a type of the object or identifying a specific object.

However, the detection processing and the recognition processing are not necessarily clearly divided, and may overlap.

For example, the recognition unit 73 detects an object around the vehicle 1 by performing clustering to classify point clouds based on sensor data by the LiDAR 53, the radar 52, or the like into clusters of point clouds. As a result, the presence or absence, size, shape, and position of an object around the vehicle 1 are detected.

For example, the recognition unit 73 detects the motion of the object around the vehicle 1 by performing tracking that follows the motion of the clusters of the point clouds classified by clustering. As a result, a speed and a traveling direction (movement vector) of the object around the vehicle 1 are detected.

For example, the recognition unit 73 detects or recognizes a vehicle, a person, a bicycle, an obstacle, a structure, a road, a traffic light, a traffic sign, a road sign, and the like with respect to the image data supplied from the camera 51. Furthermore, the type of the object around the vehicle 1 may be recognized by performing recognition processing such as semantic segmentation.

For example, the recognition unit 73 can perform recognition processing of traffic rules around the vehicle 1 on the basis of a map accumulated in the map information accumulation unit 23, an estimation result of the self position by the self-position estimation unit 71, and a recognition result of an object around the vehicle 1 by the recognition unit 73. Through this processing, the recognition unit 73 can recognize the position and the state of the signal, the contents of the traffic sign and the road marking, the contents of the traffic regulation, the travelable lane, and the like.

For example, the recognition unit 73 can perform recognition processing of the environment around the vehicle 1. As the surrounding environment to be recognized by the recognition unit 73, weather, temperature, humidity, brightness, a state of a road surface, and the like are assumed.

The action planning unit 62 creates an action plan of the vehicle 1. For example, the action planning unit 62 creates an action plan by performing processing of global path planning and path following.

Note that the global path planning is processing of planning a rough path from the start to the goal. This path planning is called a trajectory plan, and includes processing of local path planning that enables safe and smooth traveling in the vicinity of the vehicle 1 in consideration of the motion characteristics of the vehicle 1 in the route planned by the path planning. The path planning may be distinguished from long-term path planning, and startup generation from short-term path planning, or local path planning. The safety-first path represents a concept similar to startup generation, short-term path planning, or local path planning.

The path following is processing of planning an operation for safely and accurately traveling a path planned by the path planning within a planned time. For example, the action planning unit 62 can calculate the target speed and the target angular velocity of the vehicle 1 on the basis of a result of the path following processing.

The operation control unit 63 controls the operation of the vehicle 1 in order to realize the action plan created by the action planning unit 62.

For example, the operation control unit 63 controls a steering control unit 81, a brake control unit 82, and a drive control unit 83 included in the vehicle control unit 32 to be described later, and performs acceleration/deceleration control and direction control such that the vehicle 1 travels on the trajectory calculated by the trajectory plan. For example, the operation control unit 63 performs cooperative control for the purpose of implementing the functions of the ADAS such as collision avoidance or impact mitigation, follow-up traveling, vehicle speed maintaining traveling, collision warning of the host vehicle, lane deviation warning of the host vehicle, and the like. For example, the operation control unit 63 performs cooperative control for the purpose of automatic driving or the like in which the vehicle autonomously travels without depending on the operation of the driver.

The DMS 30 performs authentication processing of a driver, recognition processing of the state of the driver, and the like on the basis of sensor data from the in-vehicle sensor 26, input data input to the HMI 31 to be described later, and the like. In this case, as the state of the driver to be recognized by the DMS 30, for example, a physical condition, a wakefulness level, a concentration level, a fatigue level, a line-of-sight direction, a drunkenness level, a driving operation, a posture, and the like are assumed.

Note that the DMS 30 may perform authentication processing of a passenger other than the driver and recognition processing of the state of the passenger. Furthermore, for example, the DMS 30 may perform recognition processing of the situation inside the vehicle on the basis of sensor data from the in-vehicle sensor 26. As the situation inside the vehicle to be recognized, for example, temperature, humidity, brightness, odor, and the like are assumed.

The HMI 31 inputs various data, instructions, and the like, and presents various data to a driver or the like.

Data input by the HMI 31 will be schematically described. The HMI 31 includes an input device for a person to input data. The HMI 31 generates an input signal on the basis of data, an instruction, or the like input by an input device, and supplies the input signal to each unit of the vehicle control system 11. The HMI 31 includes an operator such as a touch panel, a button, a switch, and a lever as an input device. The present invention is not limited thereto, and the HMI 31 may further include an input device capable of inputting information by a method other than manual operation by voice, gesture, or the like. Moreover, the HMI 31 may use, for example, a remote control device using infrared rays or radio waves, or an external connection device such as a mobile device or a wearable device corresponding to the operation of the vehicle control system 11 as an input device.

Presentation of data by the HMI 31 will be schematically described. The HMI 31 generates visual information, auditory information, and tactile information for the passenger or the outside of the vehicle. Furthermore, the HMI 31 performs output control for controlling the output, output content, output timing, output method, and the like of each piece of generated information. The HMI 31 generates and outputs, for example, an operation screen, a state display of the vehicle 1, a warning display, an image such as a monitor image indicating a situation around the vehicle 1, and information indicated by light as the visual information. Furthermore, the HMI 31 generates and outputs information indicated by sounds such as voice guidance, a warning sound, and a warning message, for example, as the auditory information. Moreover, the HMI 31 generates and outputs, as the tactile information, information given to the tactile sense of a passenger by, for example, force, vibration, motion, or the like.

As an output device that the HMI 31 outputs visual information, for example, a display device that presents visual information by displaying an image by itself or a projector device that presents visual information by projecting an image can be applied. Note that the display device may be a device that displays visual information in the field of view of the passenger, such as a head-up display, a transmissive display, or a wearable device having an augmented reality (AR) function, in addition to a display device having a normal display. Furthermore, in the HMI 31, a display device included in a navigation device, an instrument panel, a camera monitoring system (CMS), an electronic mirror, a lamp, or the like provided in the vehicle 1 can also be used as an output device that outputs visual information.

As an output device from which the HMI 31 outputs the auditory information, for example, an audio speaker, a headphone, or an earphone can be applied.

As an output device to which the HMI 31 outputs tactile information, for example, a haptic element using a haptic technology can be applied. The haptics element is provided, for example, at a portion with which a passenger of the vehicle 1 comes into contact, such as a steering wheel or a seat.

The vehicle control unit 32 controls each unit of the vehicle 1. The vehicle control unit 32 includes the steering control unit 81, the brake control unit 82, the drive control unit 83, a body system control unit 84, a light control unit 85, and a horn control unit 86.

The steering control unit 81 detects and controls the state of a steering system of the vehicle 1. The steering system includes, for example, a steering mechanism including a steering wheel and the like, an electric power steering, and the like. The steering control unit 81 includes, for example, a control unit such as an ECU that controls the steering system, an actuator that drives the steering system, and the like.

The brake control unit 82 detects and controls the state of a brake system of the vehicle 1. The brake system includes, for example, a brake mechanism including a brake pedal, an antilock brake system (ABS), a regenerative brake mechanism, and the like. The brake control unit 82 includes, for example, a control unit such as an ECU that controls the brake system.

The drive control unit 83 detects and controls the state of a drive system of the vehicle 1. The drive system includes, for example, a driving force generation device for generating a driving force such as an accelerator pedal, an internal combustion engine, or a driving motor, a driving force transmission mechanism for transmitting the driving force to wheels, and the like. The drive control unit 83 includes, for example, a control unit such as an ECU that controls the drive system.

The body system control unit 84 detects and controls the state of a body system of the vehicle 1. The body system includes, for example, a keyless entry system, a smart key system, a power window device, a power seat, an air conditioner, an airbag, a seat belt, a shift lever, and the like. The body system control unit 84 includes, for example, a control unit such as an ECU that controls the body system.

The light control unit 85 detects and controls states of various lights of the vehicle 1. As the light to be controlled, for example, a headlight, a backlight, a fog light, a turn signal, a brake light, a projection, a display of a bumper, and the like are assumed. The light control unit 85 includes a control unit such as an ECU that performs light control.

The horn control unit 86 detects and controls the state of a car horn of the vehicle 1. The horn control unit 86 includes, for example, a control unit such as an ECU that controls the car horn.

Figure 2:
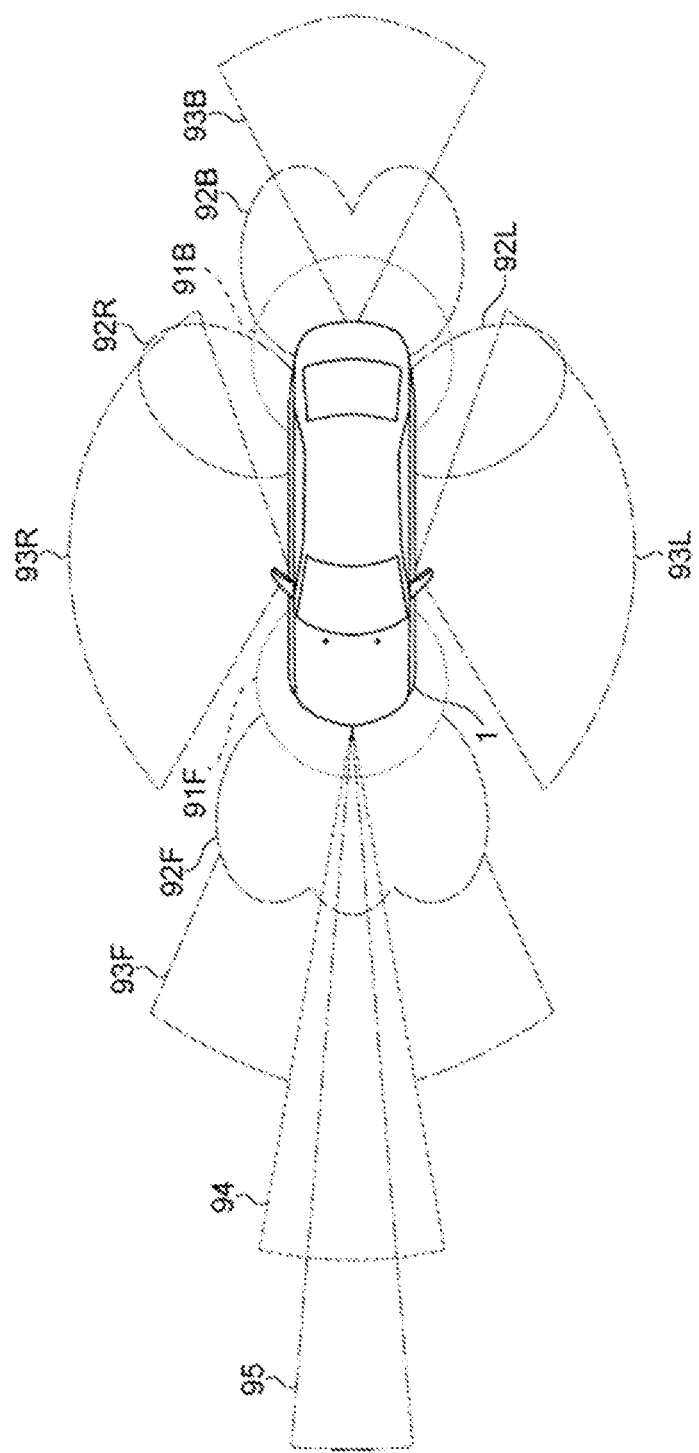
FIG. 2 is a diagram illustrating an example of a sensing region.

FIG. 2 is a diagram illustrating an example of a sensing region by the camera 51, the radar 52, the LiDAR 53, the ultrasonic sensor 54, and the like of the external recognition sensor 25 in FIG. 1. Note that FIG. 2 schematically illustrates the vehicle 1 as viewed from above, where the left end side is the front end (front) side of the vehicle 1 and the right end side is the rear end (rear) side of the vehicle 1.

A sensing region 91F and a sensing region 91B illustrate examples of the sensing region of the ultrasonic sensor 54. The sensing region 91F covers the periphery of the front end of the vehicle 1 by a plurality of the ultrasonic sensors 54. The sensing region 91B covers the periphery of the rear end of the vehicle 1 by the plurality of ultrasonic sensors 54.

The sensing results in the sensing region 91F and the sensing region 91B are used, for example, for parking assistance of the vehicle 1.

Sensing regions 92F to 92B illustrate examples of sensing regions of the radar 52 for a short distance or a middle distance. The sensing region 92F covers a position farther than the sensing region 91F in front of the vehicle 1. The sensing region 92B covers a position farther than the sensing region 91B behind the vehicle 1. The sensing region 92L covers the rear periphery of the left side surface of the vehicle 1. The sensing region 92R covers the rear periphery of the right side surface of the vehicle 1.

The sensing result in the sensing region 92F is used, for example, to detect a vehicle, a pedestrian, or the like existing in front of the vehicle 1. The sensing result in the sensing region 92B is used, for example, for a collision prevention function or the like behind the vehicle 1. The sensing results in the sensing region 92L and the sensing region 92R are used, for example, for detecting an object in a blind spot on the side of the vehicle 1.

Sensing regions 93F to 93B illustrate examples of sensing regions by the camera 51. The sensing region 93F covers a position farther than the sensing region 92F in front of the vehicle 1. The sensing region 93B covers a position farther than the sensing region 92B behind the vehicle 1. The sensing region 93L covers the periphery of the left side surface of the vehicle 1. The sensing region 93R covers the periphery of the right side surface of the vehicle 1.

The sensing result in the sensing region 93F can be used for, for example, recognition of a traffic light or a traffic sign, a lane departure prevention assist system, and an automatic headlight control system. The sensing result in the sensing region 93B can be used for, for example, parking assistance and a surround view system. The sensing results in the sensing region 93L and the sensing region 93R can be used for a surround view system, for example.

A sensing region 94 shows an example of the sensing region of the LiDAR 53. The sensing region 94 covers a position farther than the sensing region 93F in front of the vehicle 1. On the other hand, the sensing region 94 has a narrower range in a left-right direction than the sensing region 93F.

The sensing result in the sensing region 94 is used, for example, for detecting an object such as a surrounding vehicle.

A sensing region 95 illustrates an example of the sensing region of the long-range radar 52. The sensing region 95 covers a position farther than the sensing region 94 in front of the vehicle 1. On the other hand, the sensing region 95 has a narrower range in the left-right direction than the sensing region 94.

The sensing result in the sensing region 95 is used for, for example, adaptive cruise control (ACC), emergency braking, collision avoidance, and the like.

Note that the sensing regions of the sensors of the camera 51, the radar 52, the LiDAR 53, and the ultrasonic sensor 54 included in the external recognition sensor 25 may have various configurations other than those in FIG. 2. Specifically, the ultrasonic sensor 54 may also sense the side of the vehicle 1, or the LiDAR 53 may sense the rear of the vehicle 1. Furthermore, the installation position of each sensor is not limited to each example described above. Furthermore, the number of sensors may be one or more.

1.2 Configuration Example of Solid-State Imaging Device (Image Sensor)

Figure 3:
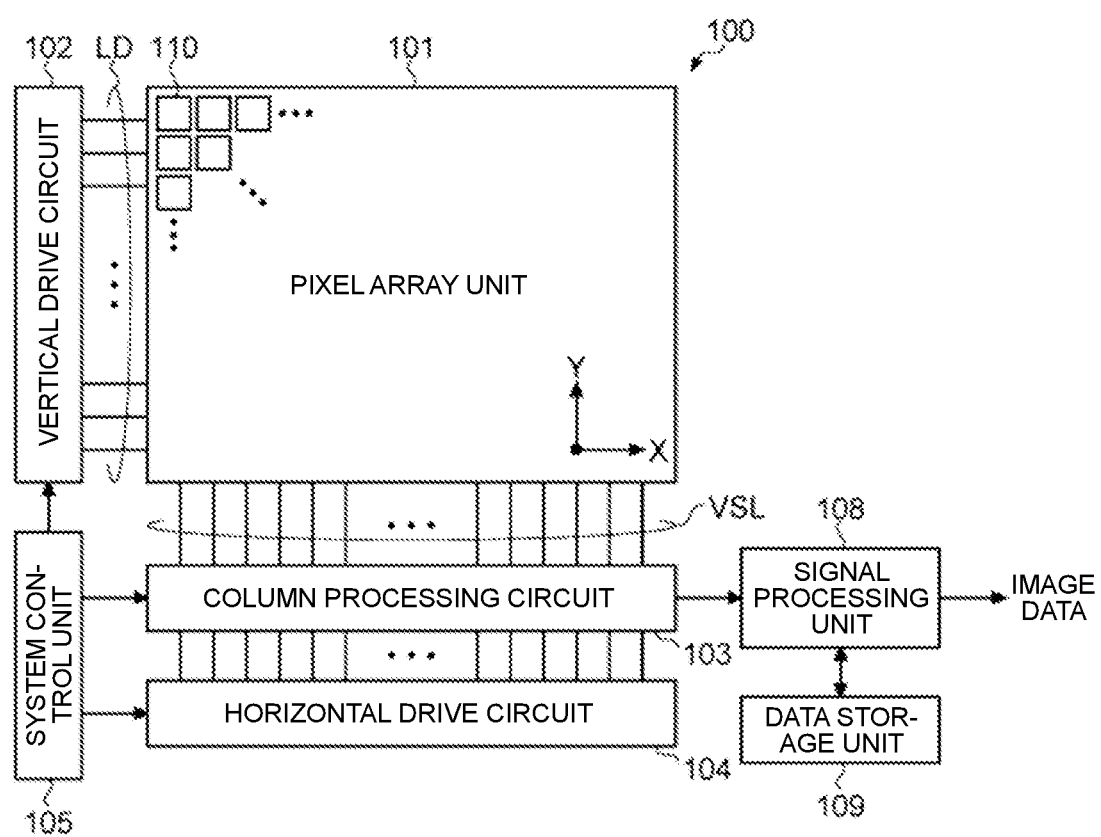
FIG. 3 is a block diagram illustrating a schematic configuration example of an image sensor according to an embodiment.

Next, a configuration example of a solid-state imaging device (Hereinafter, referred to as an image sensor.) constituting the camera 51 included in the external recognition sensor 25 will be described. Note that the camera 51 may include an image sensor 100 to be described later and an optical system arranged with respect to a light receiving surface (also referred to as an imaging region) of the image sensor 100. FIG. 3 is a block diagram illustrating a schematic configuration example of an image sensor according to the present embodiment. Here, the image sensor may be, for example, an image sensor created by applying or partially using a CMOS process.

An image sensor 100 according to the present embodiment has, for example, a stack structure in which a semiconductor chip on which a pixel array unit 101 is formed and a semiconductor chip on which a peripheral circuit is formed are stacked. The peripheral circuit may include, for example, a vertical drive circuit 102, a column processing circuit 103, a horizontal drive circuit 104, and a system control unit 105.

The image sensor 100 further includes a signal processing unit 108 and a data storage unit 109. The signal processing unit 108 and the data storage unit 109 may be provided on the same semiconductor chip as the peripheral circuit, or may be provided on another semiconductor chip.

The pixel array unit 101 has a configuration in which pixels 110 each having a photoelectric conversion element that generates and accumulates a charge according to an amount of received light are arranged in a row direction and a column direction, that is, in a two-dimensional lattice shape in a matrix. Here, the row direction refers to an arrangement direction of pixels in a pixel row (lateral direction in the drawing), and the column direction refers to an arrangement direction of pixels in a pixel column (longitudinal direction in the drawing).

In the pixel array unit 101, a pixel drive line LD is wired along the row direction for each pixel row, and a vertical signal line VSL is wired along the column direction for each pixel column with respect to the matrix-like pixel array. The pixel drive line LD transmits a drive signal for driving when a signal is read from the pixel. In FIG. 3, the pixel drive lines LD are illustrated as wiring lines one by one, but are not limited to wiring lines one by one. One end of the pixel drive line LD is connected to an output terminal corresponding to each row of the vertical drive circuit 102.

The vertical drive circuit 102 includes a shift register, an address decoder, and the like, and drives each pixel of the pixel array unit 101 at the same time for all pixels or in units of rows. That is, the vertical drive circuit 102 constitutes a drive unit that controls the operation of each pixel of the pixel array unit 101 together with the system control unit 105 that controls the vertical drive circuit 102. Although a specific configuration of the vertical drive circuit 102 is not illustrated, the vertical drive circuit generally includes two scanning systems of a readout scanning system and a sweep scanning system.

The readout scanning system sequentially selects and scans the pixels 110 of the pixel array unit 101 row by row in order to read out signals from the pixels. The signals read from the pixels 110 are analog signals. The sweep scanning system performs sweep scanning on a read row on which readout scanning is performed by the readout scanning system prior to the readout scanning by an exposure time.

By the sweep scanning by the sweep scanning system, unnecessary charges are swept out from the photoelectric conversion elements of the pixels 110 in the read row, whereby the photoelectric conversion elements are reset. Then, by sweeping out (resetting) unnecessary charges in the sweep scanning system, a so-called electronic shutter operation is performed. Here, the electronic shutter operation refers to an operation of discarding charges of the photoelectric conversion element and newly starting exposure (starting accumulation of charges).

The signal read by the readout operation by the readout scanning system corresponds to the amount of light received after the immediately preceding readout operation or electronic shutter operation. Then, a period from the readout timing by the immediately preceding readout operation or the sweep timing by the electronic shutter operation to the readout timing by the current readout operation is a charge accumulation period (also referred to as an exposure period) in the pixel 110.

A signal output from each pixel 110 of the pixel row selectively scanned by the vertical drive circuit 102 is input to the column processing circuit 103 through each of the vertical signal lines VSL for each pixel column. The column processing circuit 103 performs predetermined signal processing on the signal output from each pixel of the selected row through the vertical signal line VSL for each pixel column of the pixel array unit 101, and temporarily holds the pixel signal after the signal processing.

Specifically, the column processing circuit 103 performs at least noise removal processing, for example, correlated double sampling (CDS) processing or double data sampling (DDS) processing, as signal processing. For example, the fixed pattern noise unique to the pixel such as the reset noise and the threshold variation of an amplification transistor in the pixel is removed by the CDS processing. The column processing circuit 103 also has, for example, an analog-digital (AD) conversion function, converts an analog pixel signal read from the photoelectric conversion element into a digital signal, and outputs the digital signal.

The horizontal drive circuit 104 includes a shift register, an address decoder, and the like, and sequentially selects a readout circuit (Hereinafter, referred to as a pixel circuit.) corresponding to a pixel column of the column processing circuit 103. By the selective scanning by the horizontal drive circuit 104, pixel signals subjected to signal processing for each pixel circuit in the column processing circuit 103 are sequentially output.

The system control unit 105 includes a timing generator that generates various timing signals and the like, and performs drive control of the vertical drive circuit 102, the column processing circuit 103, the horizontal drive circuit 104, and the like on the basis of various timings generated by the timing generator.

The signal processing unit 108 has at least an arithmetic processing function, and performs various signal processing such as arithmetic processing on the pixel signal output from the column processing circuit 103. The data storage unit 109 temporarily stores data necessary for signal processing in the signal processing unit 108.

Note that the image data output from the signal processing unit 108 may be subjected to predetermined processing in the travel assistance/automatic driving control unit 29 or the like in the vehicle control system 11 equipped with the image sensor 100, or may be transmitted to the outside via the communication unit 22, for example.

1.3 Reduction in Data Amount

Figure 4:
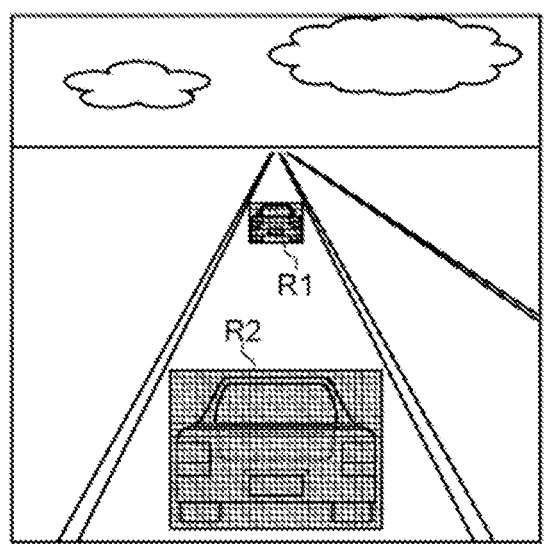
FIG. 4 is a diagram for explaining general recognition processing (part 1).
Figure 5:
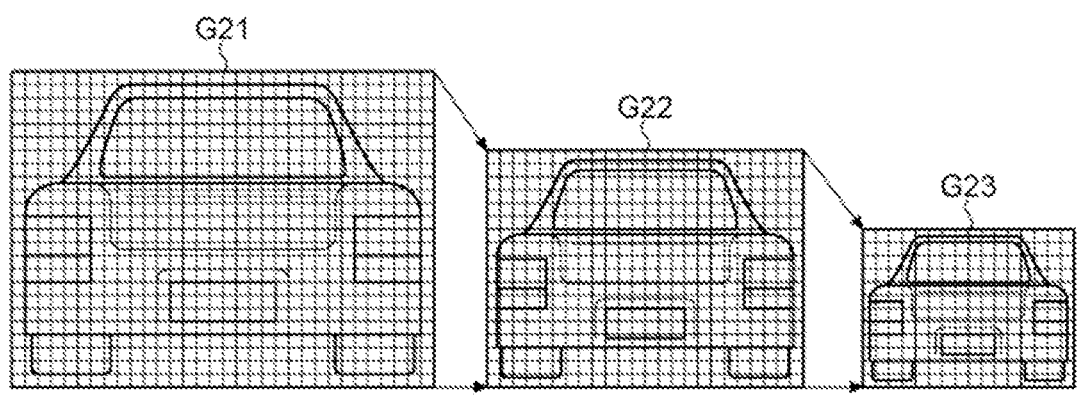
FIG. 5 is a diagram for explaining general recognition processing (part 2).

Next, reduction in the amount of data according to the present embodiment will be described. FIGS. 4 and 5 are diagrams for explaining general recognition processing.

In general recognition processing, processing is executed on image data read with a uniform resolution. Alternatively, the image data may be partitioned into regions, and processing may be performed on each of the partitioned regions.

Here, as illustrated in FIG. 4, in the normal readout operation, a region R1 in which an object existing far away is captured and a region R2 in which an object existing near is captured are read at the same resolution. Therefore, for example, the region R2 in which an object present nearby is captured is read with a resolution finer than a resolution required for the recognition processing.

In such a case, in the general recognition processing, processing of reducing the resolution of the entire image to an appropriate resolution is performed. Alternatively, in a case where the region partitioning is executed on the image data, as illustrated in FIG. 5, processing of reducing the resolution of image data G21 read from the partitioned region R2 to image data G22 or G23 having an appropriate resolution is performed. This means that in data transfer for the purpose of recognition processing, unnecessary traffic is generated by a difference between the data amount of the image data G21 as RAW data and the data amount of the image data G22 or G23 having a resolution suitable for recognition processing. Furthermore, in the recognition processing, it also means that redundant processing such as resolution reduction has occurred.

Therefore, in the present embodiment, the region R1 in which an object existing far is captured is read with high resolution, and the other regions are read with low resolution. As a result, the data amount of the image data (frame data) output from the image sensor 100 can be reduced, and redundant processing such as resolution reduction can be omitted, so that an increase in cost and an increase in processing time can be suppressed.

1.4 Schematic Configuration Example of Image Processing Device

Next, an image processing device according to the present embodiment capable of reducing the above-described data amount will be described. In the present embodiment, for example, image data of the entire angle of view (however, in a case where a frame data is limited to a partial region within the angle of view, image data of the partial region) is first read from the image sensor 100. Then, in a case where a far subject is present within the angle of view, a region (corresponding to a region of interest (ROI) to be described later) in which the far subject is captured is read with high resolution. Thereafter, the low-resolution image and the high-resolution image are integrated (For example, the high-resolution image is incorporated in the ROI in the low-resolution image), thereby generating image data (frame data) in which the ROI including a distant object is expressed with high resolution and the other regions are expressed with low resolution. Alternatively, the low-resolution image and the high-resolution image may not be integrated and may be output as separate image data.

In the present embodiment, the ROI may be determined outside the image sensor 100 (Hereinafter, also referred to as outside of chip) or may be determined inside the image sensor 100 (Hereinafter, also referred to as in chip). Hereinafter, a configuration in each case will be described with an example.

1.4.1 when ROI is Determined Outside Chip

Figure 6:
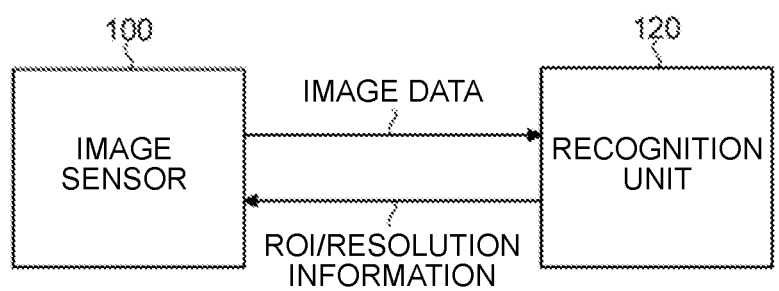
FIG. 6 is a block diagram illustrating an outline of an image processing device in a case where an ROI according to an embodiment is determined outside a chip.

FIG. 6 is a block diagram illustrating an outline of the image processing device in a case where the ROI is determined outside a chip. As illustrated in FIG. 6, the image processing device includes the image sensor 100 and a recognition unit 120.

The image sensor 100 corresponds to, for example, the camera 51, the in-vehicle sensor 26, and the like described above with reference to FIG. 1, and generates and outputs image data. The output image data is input to the travel assistance/automatic driving control unit 29 or the like via a predetermined network such as the communication network 41 described above with reference to FIG. 1, for example.

The recognition unit 120 corresponds to, for example, the recognition unit 73 and the like described above with reference to FIG. 1, and detects an object, a background, and the like included in an image by executing recognition processing on image data input from the image sensor 100. Note that the object may include not only a moving object such as an automobile, a bicycle, or a pedestrian but also a fixed object such as a building, a house, or a tree. On the other hand, the background may be a wide region located far away, such as sky, mountains, plains, or the sea.

Furthermore, the recognition unit 120 determines the region of the object or the region of the background obtained as a result of the recognition processing on the image data as the ROI which is a partial region of an effective pixel region in the pixel array unit 101. In addition, the recognition unit 120 determines the resolution of each ROI. Then, the recognition unit 120 notifies the image sensor 100 of information of the determined ROI and resolution (hereinafter, referred to as ROI/resolution information), thereby setting the ROI to be read and the resolution at the time of reading the image data from each ROI in the image sensor 100.

Note that the ROI information may be, for example, information regarding an address of a pixel as a starting point of the ROI and a size in the vertical and horizontal directions. In this case, each ROI is a rectangular region. However, the ROI is not limited thereto, and may be a circle, an ellipse, or a polygon, or may be an indefinite region specified by information designating a boundary (contour). Furthermore, in a case where a plurality of the ROIs is determined, the recognition unit 120 may determine different resolutions for each ROI.

1.4.2 when ROI is Determined in Chip

Figure 7:
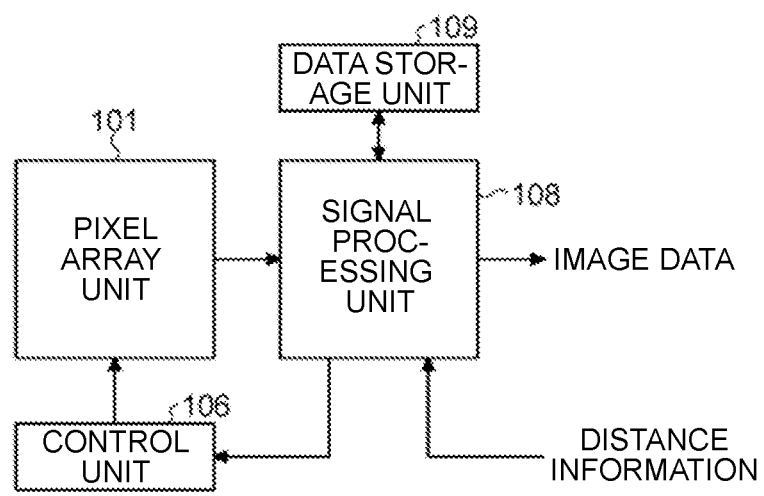
FIG. 7 is a block diagram illustrating an outline of an image sensor in a case where an ROI according to an embodiment is determined in a chip.

FIG. 7 is a block diagram illustrating an outline of an image sensor in a case where an ROI is determined in a chip. Note that, in the configuration of FIG. 7, the vertical drive circuit 102, the column processing circuit 103, the horizontal drive circuit 104, and the system control unit 105 in the image sensor 100 illustrated using FIG. 3 are integrated into a control unit 106. Furthermore, in the present description, the pixel array unit 101 and the control unit 106 are also referred to as imaging units.

In the present example, the signal processing unit 108 specifies one or more regions in the angle of view of the object existing far away on the basis of the image data read from the pixel array unit 101, distance information input from a distance measuring sensor such as the external radar 52, the LiDAR 53, or the ultrasonic sensor 54, or the like, and determines each of the specified one or more regions as an ROI. That is, the signal processing unit 108 functions as a determination unit that determines two or more regions including one or more ROIs (also referred to as first regions) with respect to the effective pixel region of the image sensor 100 and other regions (also referred to as second regions). At that time, the signal processing unit 108 may determine the resolution of each ROI. Then, the signal processing unit 108 sets information (ROI/resolution information) of the determined ROI and resolution in the control unit 106. Note that the ROI/resolution information may be similar to the case where the ROI is determined outside the chip.

However, in the case of determining the ROI in the chip, the operation in the case of determining the ROI outside the chip may be simplified. That is, in a case where the ROI has already been set, the ROI may be read with high resolution, then the region other than the ROI may be read with low resolution, and the frame data may be generated by incorporating the previously read high resolution image into the low resolution image from which the ROI has been omitted, or the region other than the ROI may be read with low resolution, then the ROI may be read with high resolution, and the frame data may be generated by incorporating the read high resolution image into the low resolution image from which the ROI has been omitted. Alternatively, in one readout operation, the frame data may be generated by reading the ROI with high resolution and the other regions (also referred to as second regions) with low resolution.

1.5 Determination of ROI Using Image Plane Phase Difference

As described above, the ROI in which a distant object is shown in the image data can be determined by performing image recognition on the frame data of the previous frame or the current frame or based on distance information input from an external distance measuring sensor. However, for example, in a case where the pixel array unit 101 includes a pixel capable of detecting an image plane phase difference, it is also possible to determine the ROI on the basis of the image plane phase difference.

Here, the pixel (Hereinafter, the pixel is also referred to as an image plane phase difference pixel.) capable of detecting the image plane phase difference is, for example, a pixel in which the light receiving surface is divided into two in the left-right direction or the up-down direction according to a positional relationship with the optical center and one region is shielded from light, and is a pixel in which one of the upper side and the lower side, or the left side and the right side is shielded from light and a pixel adjacent to the pixel and the other one of the upper side and the lower side, or the left side and the right side is shielded from light, which are read as a pair and whose luminance is compared, whereby the image plane phase difference can be detected. That is, in a case where the two image plane phase difference pixels forming a pair are in focus, the luminance values detected by the two image plane phase difference pixels become equal, and in a case where the two image plane phase difference pixels are not in focus, a difference occurs between the luminance values detected by the two image plane phase difference pixels. Note that an image plane phase difference autofocus is a technique of focusing on a specific subject by using a ratio of the luminance values (corresponding to the image plane phase difference). Furthermore, the image plane phase difference pixel may have a configuration similar to that of the normal pixel 110 except that half of the light receiving surface is shielded from light.

By arranging such image plane phase difference pixels in a part or the whole of the pixel array unit 101, it is possible to calculate the defocus amount in each region of the pixel array unit 101 on the basis of the image plane phase difference, and thus, it is possible to divide the angle of view of the image sensor 100 into a region where the distance to the object is long and other regions. Note that, in a case where the image plane phase difference pixels are arranged in a part of the pixel array unit 101, it is preferable that the image plane phase difference pixels are evenly arranged in the entire pixel array unit 101.

1.6 Generation of Frame Data in Case of Using Image Plane Phase Difference

Generation of frame data in a case where an image plane phase difference is used will be described. In the case of using the image plane phase difference, as a method of generating frame data including the high resolution region and the low resolution region, a method of binning on a pixel before reading image data (Hereinafter, it is also referred to as a method of binning on a pixel.) and a method of binning the read image data by calculation (Hereinafter, it is also referred to as a method of binning by calculation.) can be considered. Each generation method will be described below.

1.6.1 Method of Binning on Pixel

Figure 8:
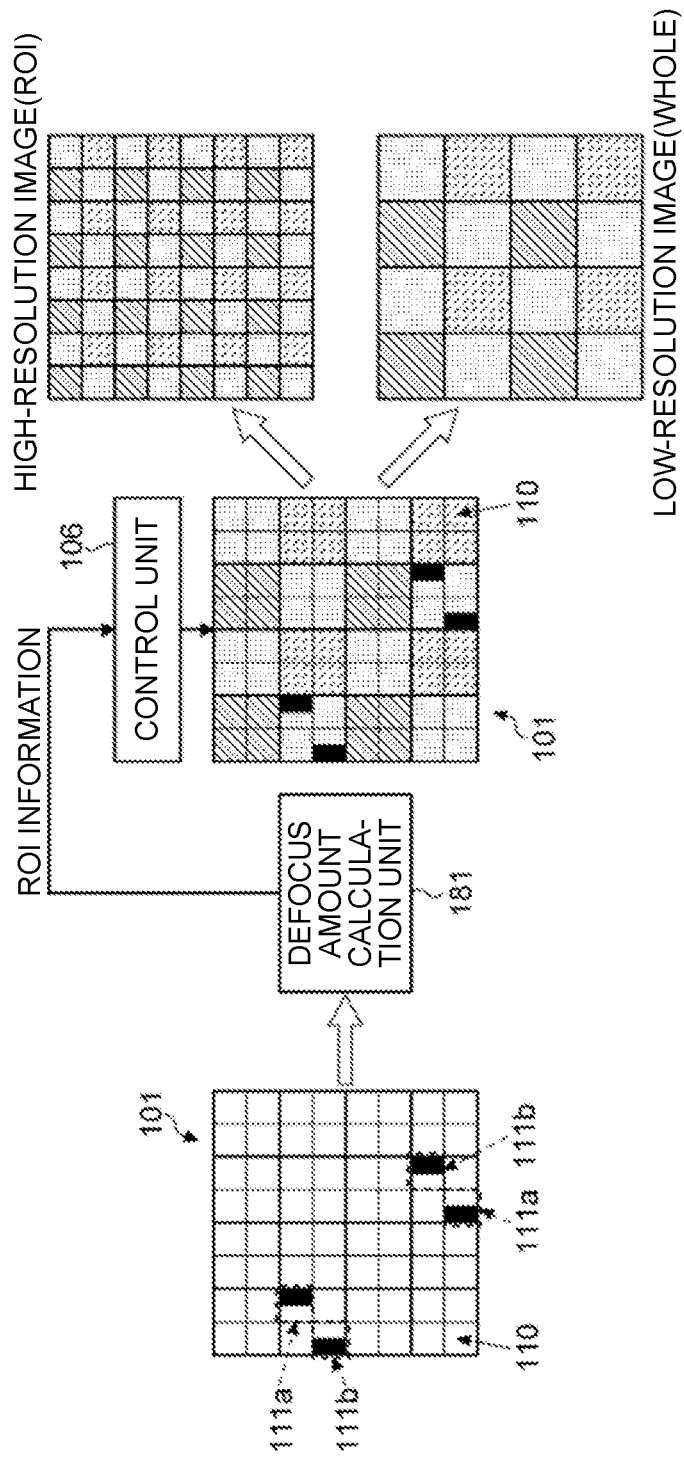
FIG. 8 is a diagram for explaining a method of binning on a pixel according to an embodiment.

FIG. 8 is a diagram for explaining a method of binning on a pixel according to the present embodiment. Note that FIG. 8 illustrates a case where image plane phase difference pixels 111a and 111b are uniformly arranged in the entire pixel array unit 101. Furthermore, FIG. 8 illustrates a case where a color filter of a quad-Bayer array obtained by further dividing each color filter of the Bayer array into four is used as a color filter. In this case, the image plane phase difference pixels 111a and 111b may be arranged at two diagonal positions among 2×2 color filters that selectively transmit green light.

As illustrated in FIG. 8, in the method of binning on a pixel, first, readout for the image plane phase difference pixels 111a and 111b in the pixel array unit 101 is executed. A pixel signal read from each of the image plane phase difference pixels 111a and 111b is input to a defocus amount calculation unit 181.

The defocus amount calculation unit 181 may have a configuration implemented in the signal processing unit 108, for example. The defocus amount calculation unit 181 calculates a ratio of the luminance values indicated by the pixel signals read from the paired image plane phase difference pixels 111a and 111b, thereby calculating a defocus amount of the region (which may include the peripheral region) in which each pair of the image plane phase difference pixels 111a and 111b is arranged. Then, the defocus amount calculation unit 181 specifies a region in which a distant object is projected in the pixel array unit 101 on the basis of the calculated defocus amount, and determines the specified region as an ROI. Then, the defocus amount calculation unit 181 sets the determined ROI (ROI information) in the control unit 106. As a result, the high-resolution image is read from the region where the ROI is set, and the low-resolution image is read from the region other than the ROI. Note that either the high-resolution image or the low-resolution image may be read first. Furthermore, the high-resolution image read from the ROI may be then remosaiced in the signal processing unit 108, for example, to be converted into image data in the Bayer array, for example.

Furthermore, in the present example, since the resolutions of the images read from the ROI and the region other than the ROI are fixed, respectively, the resolutions of the ROI and the region other than the ROI are not determined by the defocus amount calculation unit 181. However, in a case where the resolution is not fixed or there are three or more options of the resolution, the defocus amount calculation unit 181 may determine the resolutions of the ROI and the region other than the ROI together with the ROI.

As described above, according to the method of binning on a pixel, the number of pixels to be driven and the number of AD conversion circuits to be driven in the column processing circuit 103 can be reduced for the region to be read at low resolution, so that the driving power can be reduced. Furthermore, since the process of remosaic can be reduced for the low-resolution image, effects such as reduction in processing load and reduction in necessary memory capacity can also be expected.

1.6.2 Method of Binning by Calculation

Figure 9:
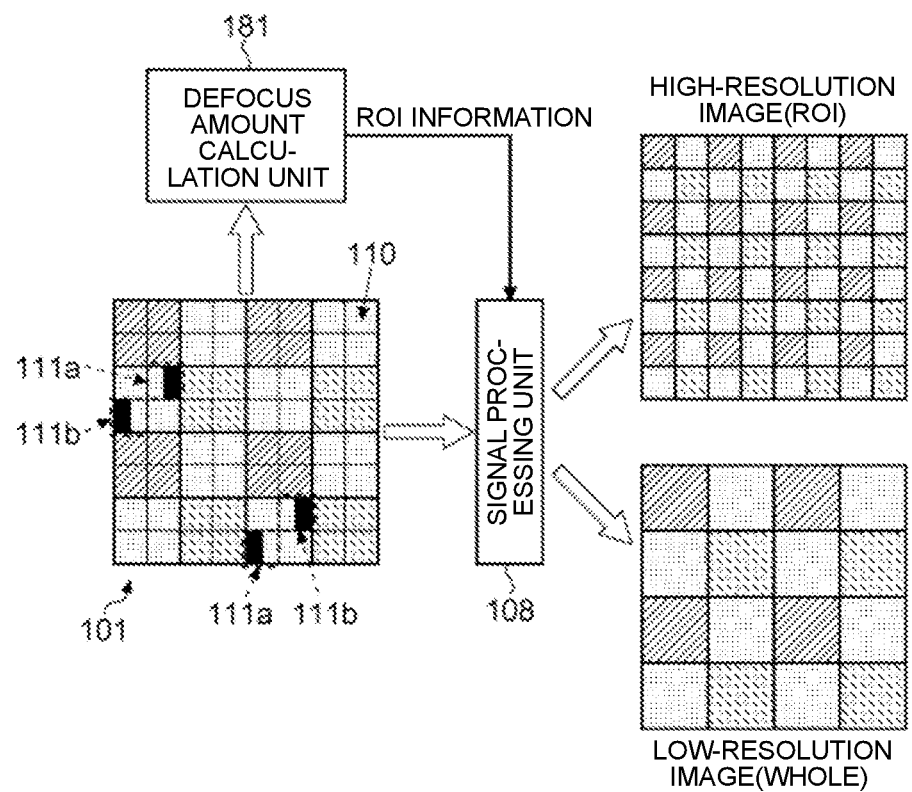
FIG. 9 is a diagram for explaining a method of binning by calculation according to an embodiment.

FIG. 9 is a diagram for describing a method of binning by calculation according to the present embodiment. Note that, similarly to FIG. 8, FIG. 9 illustrates a case where the image plane phase difference pixels 111*a* and 111*b* are uniformly arranged in the entire pixel array unit 101, and a color filter in a quad-Bayer array is used as the color filter.

As illustrated in FIG. 9, in the method of binning by calculation, first, reading of a high-resolution image is executed for all the pixels (however, in the effective pixel region) of the pixel array unit 101. The read image data is input to the defocus amount calculation unit 181.

For example, the defocus amount calculation unit 181 realized in the signal processing unit 108 calculates a ratio of pixel values (corresponding to luminance values) of pixels read from the paired image plane phase difference pixels 111*a* and 111*b* in the input image data, thereby calculating a defocus amount of a region (which may include a peripheral region) in which each pair of the image plane phase difference pixels 111*a* and 111*b* is arranged. Then, the defocus amount calculation unit 181 specifies a region in which a distant object is projected in the pixel array unit 101 on the basis of the calculated defocus amount, and determines the specified region as an ROI. Then, the defocus amount calculation unit 181 sets the determined ROI (ROI information) in the signal processing unit 108. The signal processing unit 108 may be a processing unit other than a portion functioning as the defocus amount calculation unit 181 in the signal processing unit 108.

The signal processing unit 108 in which the ROI is set executes remosaic on the ROI in the high-resolution image read from the pixel array unit 101. Furthermore, the signal processing unit 108 executes binning for reducing the resolution of a region other than the ROI in the high-resolution image read from the pixel array unit 101. For example, a 4×4 quad Bayer array is converted to a 2×2 Bayer array.

As described above, according to the method of binning by calculation, it is possible to combine the readout operation with respect to the pixel array unit 101 at a time of the high-resolution image, and thus, it is possible to simplify the readout sequence. Furthermore, since the process of remosaic can be reduced for the low-resolution image, effects such as reduction in processing load and reduction in necessary memory capacity can also be expected. Moreover, since a blank region (corresponding to the ROI region) in the low-resolution image when the low-resolution image and the high-resolution image are separately read does not occur, the processing on the image data can be simplified.

1.7 In-Focus Position when Image Plane Phase Difference is Used

Figure 10:
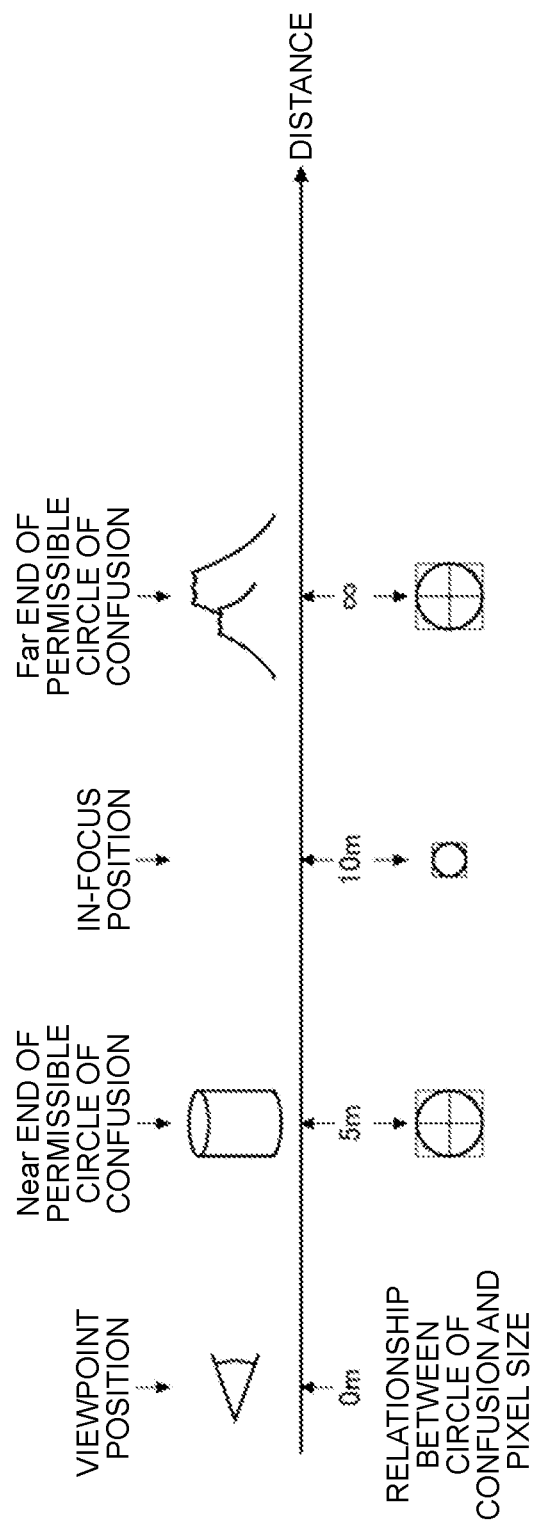
FIG. 10 is a schematic diagram (part 1) illustrating an example of an in-focus position of an imaging lens according to an embodiment.
Figure 11:
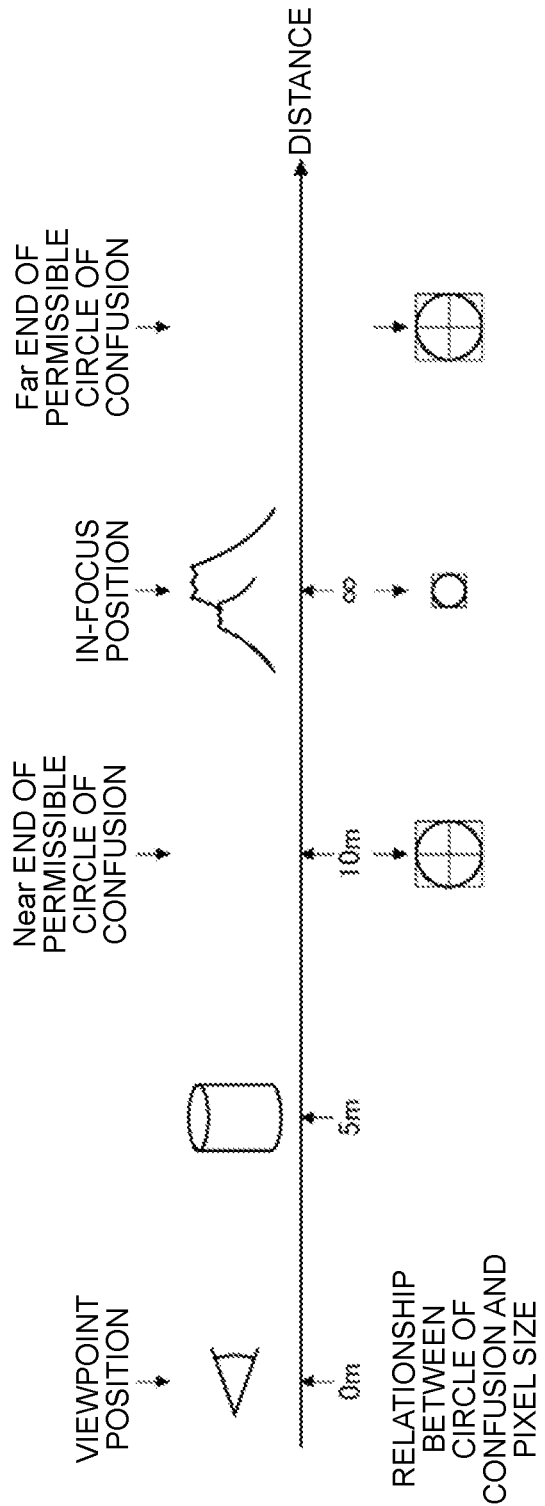
FIG. 11 is a schematic diagram (part 2) illustrating an example of the in-focus position of the imaging lens according to an embodiment.
Figure 12:
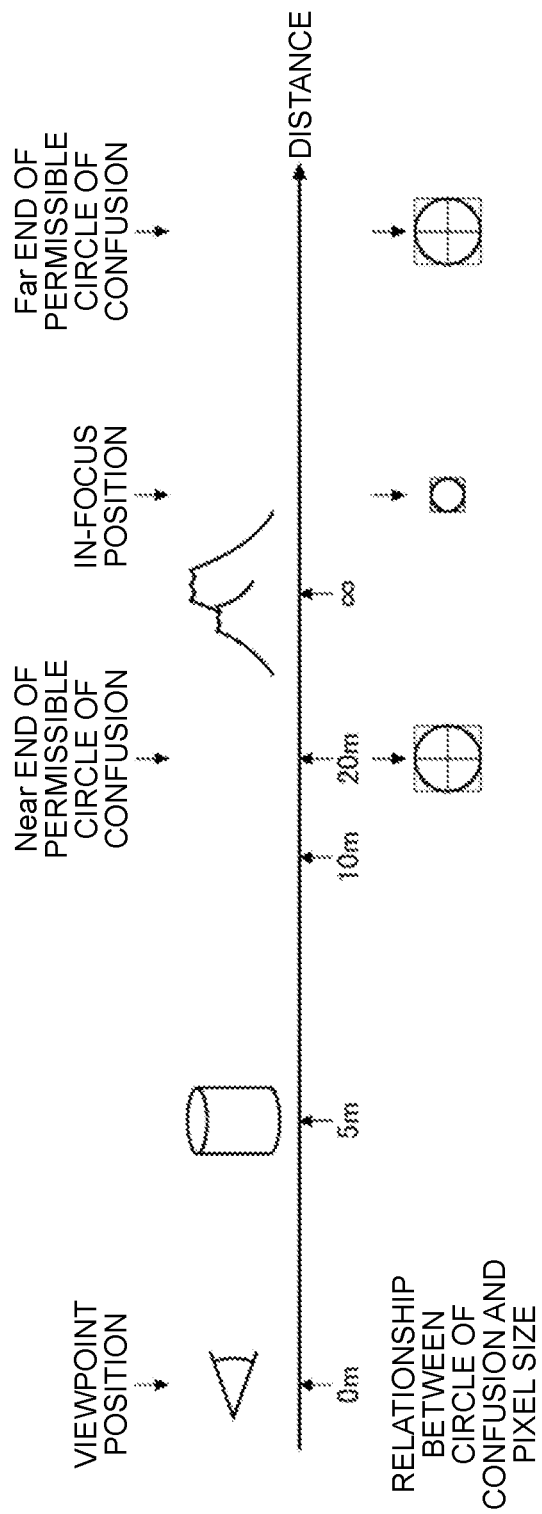
FIG. 12 is a schematic diagram (part 3) illustrating an example of the in-focus position of the imaging lens according to an embodiment.

Next, an in-focus position of the optical system (Hereinafter, for simplification of description, referred to as an imaging lens.) arranged on the light receiving surface of the image sensor 100 will be described. FIGS. 10 to 12 are schematic diagrams illustrating examples of the in-focus position of the imaging lens, FIG. 10 is a diagram illustrating a case where the in-focus position is set at a position away from the light receiving surface of the image sensor 100 by a predetermined distance (However, less than infinity) along the optical axis, FIG. 11 is a diagram illustrating a case where the in-focus position is set at a distance of infinity, and FIG. 12 is a diagram illustrating a case where the in-focus position is set at a position farther away from infinity (hereinafter, also referred to as Over-INF).

As illustrated in FIG. 10, in a normal image sensor, an in-focus position of an imaging lens is set such that focusing is performed in a range from a position away from the imaging lens by a predetermined distance (in FIG. 10, as an example, 5 m (meters)) along an optical axis to infinity. The Near end of the permissible circle of confusion is a position away from the imaging lens, which is a lower limit of the focusable range, by a predetermined distance (in this example, 5 m) along the optical axis, and the Far end is a position at infinity, which is an upper limit of the focusable range. Note that, in the present description, the size of the circle of confusion is assumed to be smaller than the size of the pixel 110 at the in-focus position, and the size of the circle of confusion is assumed to be larger than the size of the pixel 110 in a range closer than the Near end and a range farther than the Far end of the permissible circle of confusion.

Furthermore, for example, as illustrated in FIG. 11, in a case where the in-focus position of the imaging lens is set to a farther position (in FIG. 11, a position at infinity), the in-focus range of the imaging lens can be shifted to a farther position.

Therefore, in the present embodiment, the in-focus position of the imaging lens is adjusted for the purpose of setting a boundary between a distant object and other objects. For example, as illustrated in FIG. 12, in a case where an object 20 m or more away from the light receiving surface of the image sensor 100 along the optical axis is a distant object, the in-focus position of the imaging lens is set such that the lower limit of the focusable range is a position 20 m away from the light receiving surface of the image sensor 100 along the optical axis. At that time, the in-focus position of the imaging lens may be located farther than infinity (Over-INF).

In this manner, by setting the lower limit of the focusable range of the imaging lens at a position defined as far, it is possible to determine whether the object exists far or at a position closer than far on the basis of whether or not the captured object is in focus, that is, whether or not an image plane phase difference occurs. In this case, an object in focus may be determined as an object located far away, and an object not in focus may be determined as an object located closer than the far away. Note that, in the present example, it is assumed that the position of the imaging lens with respect to the light receiving surface of the image sensor 100 is fixed.

1.8 ROI Determination Method when Image Plane Phase Difference is Used

Next, a method of determining the ROI in the case of using the image plane phase difference will be described. In the present description, a case where a plurality of image plane phase difference detection regions is uniformly set for the entire pixel array unit 101 will be exemplified. Note that the image plane phase difference detection region is a region in which one or more sets of image plane phase difference pixels 111*a* and 111*b* are arranged, and may be a unit region when the distance to the object is specified on the basis of the image plane phase difference.

Figure 13:
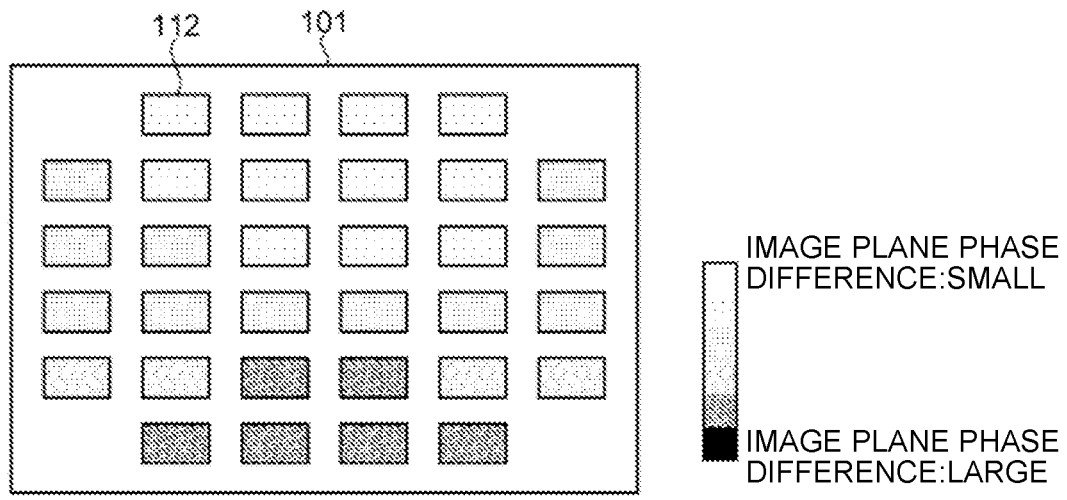
FIG. 13 is a diagram (part 1) for explaining an operation when an ROI is determined using an image plane phase difference according to an embodiment.
Figure 14:
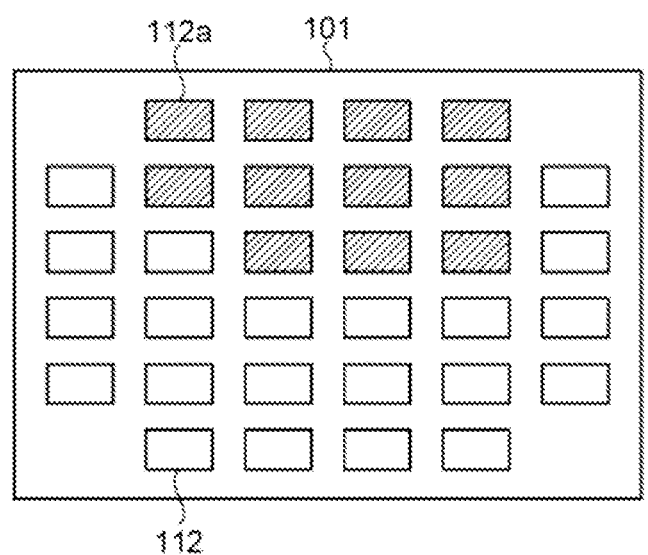
FIG. 14 is a diagram (part 2) for explaining an operation when an ROI is determined using an image plane phase difference according to an embodiment.
Figure 15:
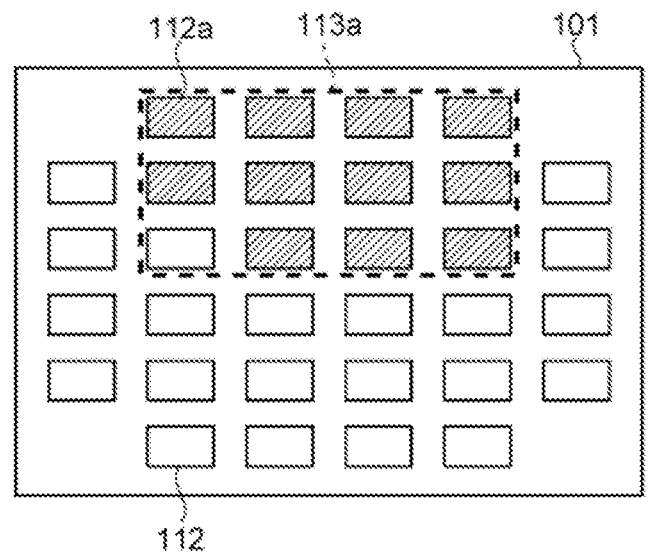
FIG. 15 is a diagram (part 3) for explaining an operation when an ROI is determined using an image plane phase difference according to an embodiment.
Figure 16:
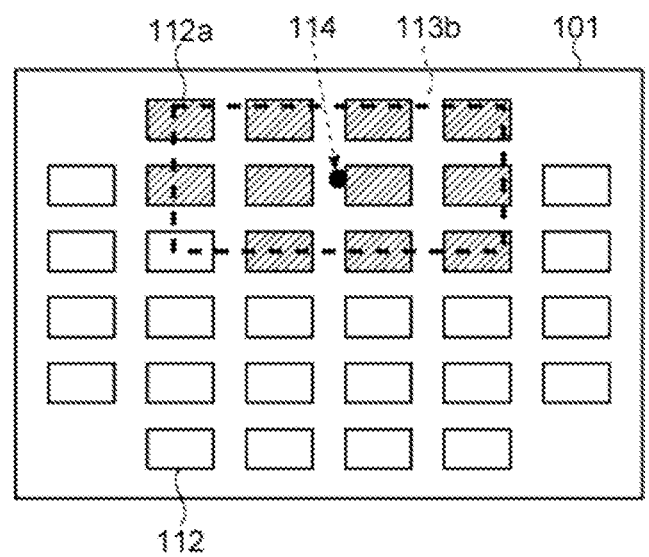
FIG. 16 is a diagram for explaining another operation when an ROI is determined using an image plane phase difference according to an embodiment.

FIGS. 13 to 15 and 16 are diagrams for describing an operation when the ROI is determined using the image plane phase difference. For example, as illustrated in FIG. 13, in a case where a plurality of image plane phase difference detection regions 112 is uniformly set for the entire pixel array unit 101, when regions 112*a* in which image plane phase differences less than or equal to a preset threshold are detected are collectively distributed as illustrated in FIG. 14, a rectangular region 113*a* including all of the collectively distributed regions 112*a* may be set in the ROI as illustrated in FIG. 15. Alternatively, as illustrated in FIG. 16, a region 113*b* having a constant size or an arbitrary size with the center or the center of gravity of the region 112*a* to be distributed as a center 114 may be set in the ROI. Note that in a case where the distribution of the region 112*a* is divided into two or more regions, an ROI may be set for each of the regions 113*a* and 113*b*. Note that in a case where the region 113*b* has an arbitrary size, for example, the size of the region 113*b* may be determined based on the distribution size of the region 112*a*.

1.8.1 First Modification Example of ROI Determination Method

Figure 17:
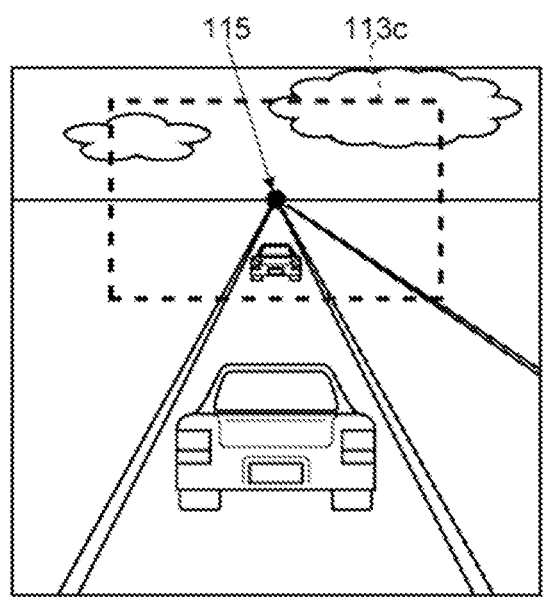
FIG. 17 is a diagram for explaining another operation when an ROI is determined using a vanishing point according to an embodiment.

Note that the ROI may be determined based on, for example, a vanishing point instead of the image plane phase difference. For example, as illustrated in FIG. 17, a vanishing point 115 in the image data read from the pixel array unit 101 may be specified, and a region 113*c* having a fixed size or an arbitrary size centered on the specified vanishing point may be set in an ROI.

1.8.2 Second Modification Example of ROI Determination Method

Furthermore, in the above description, the case where the ROI is determined on the basis of the image plane phase difference in the chip has been exemplified, but it is also possible to determine the ROI in the chip using a different method.

For example, when the Far end of the permissible circle of confusion is set to infinity or more than infinity, a circle of confusion occurs in a range closer than the Near end of the permissible circle of confusion in the image data read from the normal image sensor 100. The size of the circle of confusion increases toward the image sensor 100. Therefore, in the present embodiment, an edge of an object captured in image data may be detected on the basis of contrast, for example, and if the detected edge is clear, it may be determined as a far object, and if the detected edge is blurred, it may be determined as a near object, and an ROI may be set.

Figure 18:
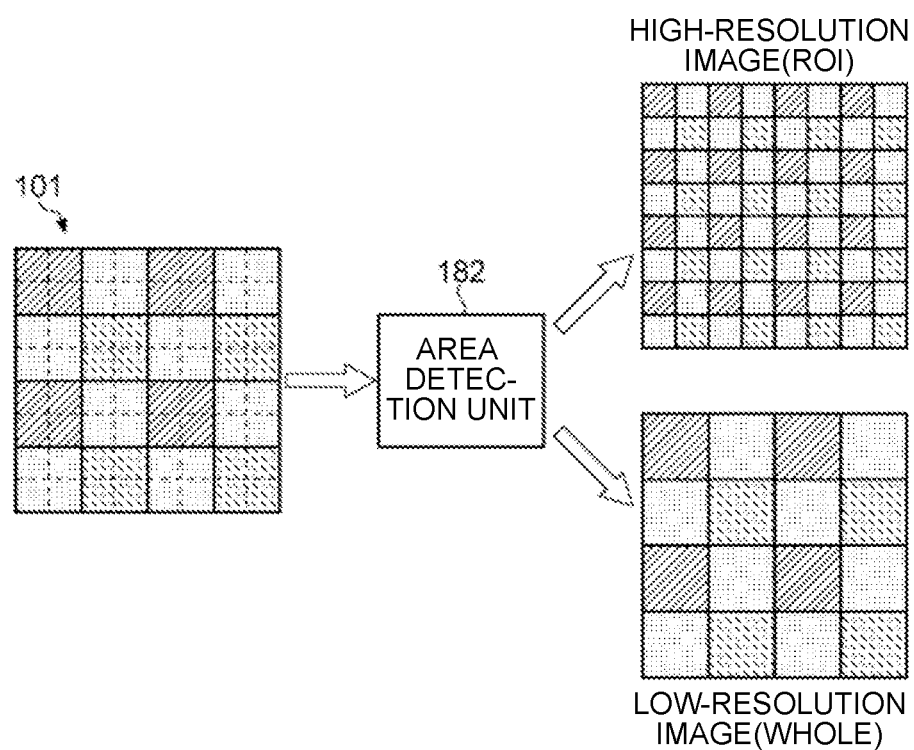
FIG. 18 is a diagram for explaining an ROI determination method according to a second modification example of an embodiment.
Figure 19:
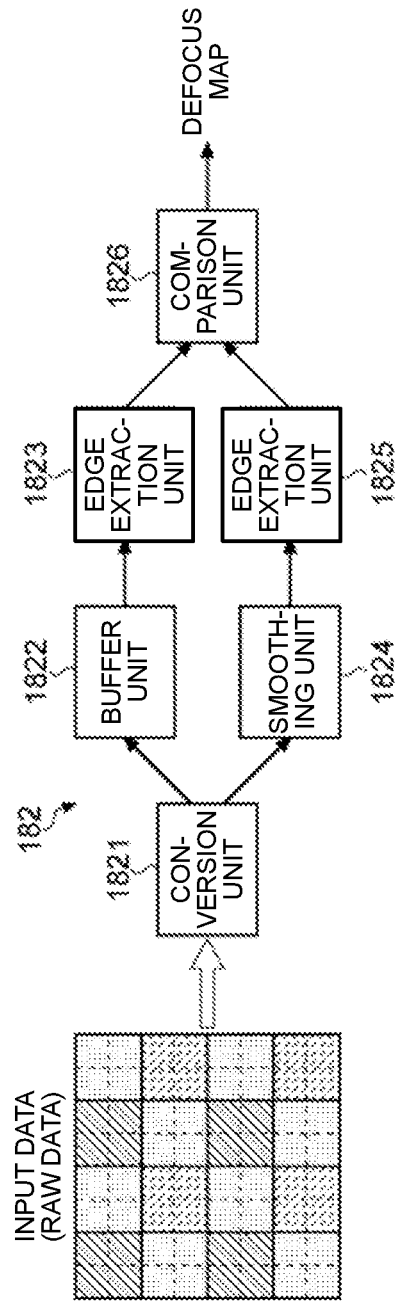
FIG. 19 is a diagram for explaining an operation of an area detection unit illustrated in FIG. 18.

FIG. 18 is a diagram for explaining an ROI determination method according to a second modification example. FIG. 19 is a diagram for explaining an operation of an area detection unit illustrated in FIG. 18. Note that, in FIGS. 18 and 19, a case where a color filter in a quad-Bayer array is used as the color filter is illustrated, similarly to FIG. 8 and the like.

As illustrated in FIG. 18, the image data (RAW data) read from the pixel array unit 101 is input to, for example, an area detection unit 182 realized in the signal processing unit 108, and in the area detection unit 182, remosaic for high-resolution imaging is executed for the ROI, and binning by calculation for resolution reduction is executed for the other regions.

As illustrated in FIG. 19, the area detection unit 182 includes a conversion unit 1821, a buffer unit 1822, a smoothing unit 1824, edge extraction units 1823 and 1825, and a comparison unit 1826.

The conversion unit 1821 converts the RAW data read from the pixel array unit 101 into monochromatic luminance image data. For example, the conversion unit 1821 generates luminance image data in which all the pixels are G pixels by interpolating the R pixel and the B pixel of the RAW data including the three primary colors of RGB with the values of surrounding G pixels. The generated luminance image data is input to the buffer unit 1822 and the smoothing unit 1824.

The buffer unit 1822 temporarily holds the input luminance image data and then inputs the luminance image data to the edge extraction unit 1823. The edge extraction unit 1823 extracts an edge included in the luminance image data by using, for example, a Laplacian filter and inputs the result to the comparison unit 1826.

On the other hand, for example, the smoothing unit 1824 smooths the input luminance image data using a filter such as a moving average or a Gaussian, and inputs the smoothed luminance image data to the edge extraction unit 1825. The edge extraction unit 1825 extracts an edge included in the smoothed luminance image data by using, for example, a Laplacian filter and inputs the result to the comparison unit 1826.

The comparison unit 1826 compares the edge extracted from the unsmoothed luminance image data with the edge extracted from the smoothed luminance image data to specify an out-of-focus region. That is, in a region (in-focus region) in focus in the RAW data, the edge in the image is smoothed by smoothing, whereas in a region (de-focus region) in non-focus, the edge in the RAW data is originally gentle, and thus the edge in the image does not change so much even by smoothing. Therefore, in a case where the edge extracted from the unsmoothed luminance image data is compared with the edge extracted from the smoothed luminance image data, a ratio between the edge extracted from the unsmoothed luminance image data and the edge extracted from the smoothed luminance image data is larger than 1 in the in-focus region, whereas the ratio is a value close to 1 in the de-focus region. Therefore, the comparison unit 1826 specifies a region in which the ratio between the edge extracted from the unsmoothed luminance image data and the edge extracted from the smoothed luminance image data is close to 1 as a de-focus region, and sets the specified region in an ROI.

1.9 Estimation of Vanishing Point and Motion Vector Estimation (ME)

Here, estimation of a vanishing point and search of a motion vector in image data will be described. Usually, a position of the vanishing point in the image is specified based on a line segment extracted from the image. On the other hand, in the case of frame data acquired by a camera mounted on a vehicle or the like as in the camera 51 according to the present embodiment, since the traveling direction of the vehicle or the like is substantially constant, the position of the vanishing point in the preceding and following frame data does not change much. Furthermore, the motion vector in each frame data is a vector along a radiation direction centered on the vanishing point. Therefore, in the present embodiment, the position of the vanishing point in the current frame may be estimated based on a motion vector detected in the previous frame, and a search range of the motion vector may be limited based on the estimated position of the vanishing point. As a result, it is possible to significantly shorten the estimation time of the vanishing point and the search time of the motion vector, and improve the accuracy thereof. Note that the motion vector search (ME) according to the present embodiment may be executed by, for example, the signal processing unit 108 in FIG. 3, or may be executed by another unit such as the travel assistance/automatic driving control unit 29 (see FIG. 1).

Figure 20:
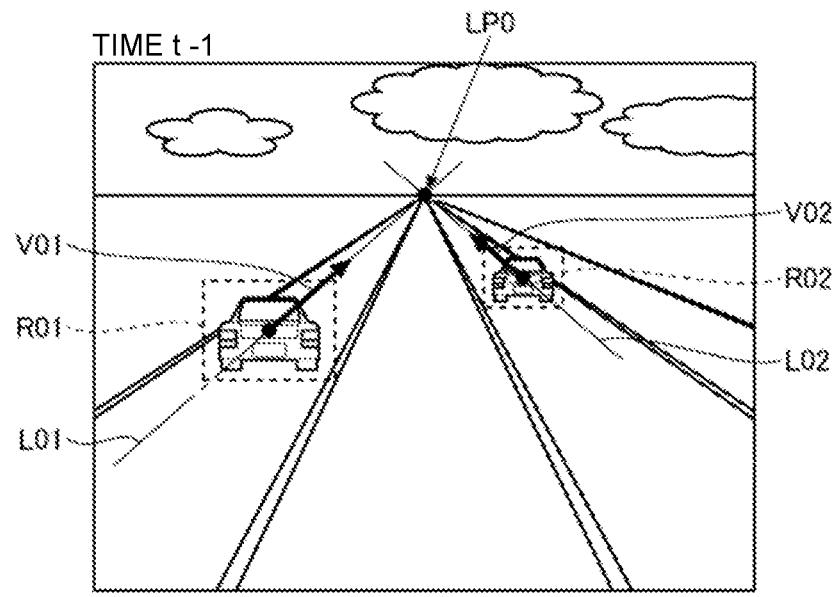
FIG. 20 is a diagram (part 1) for explaining a motion vector search operation according to an embodiment.
Figure 21:
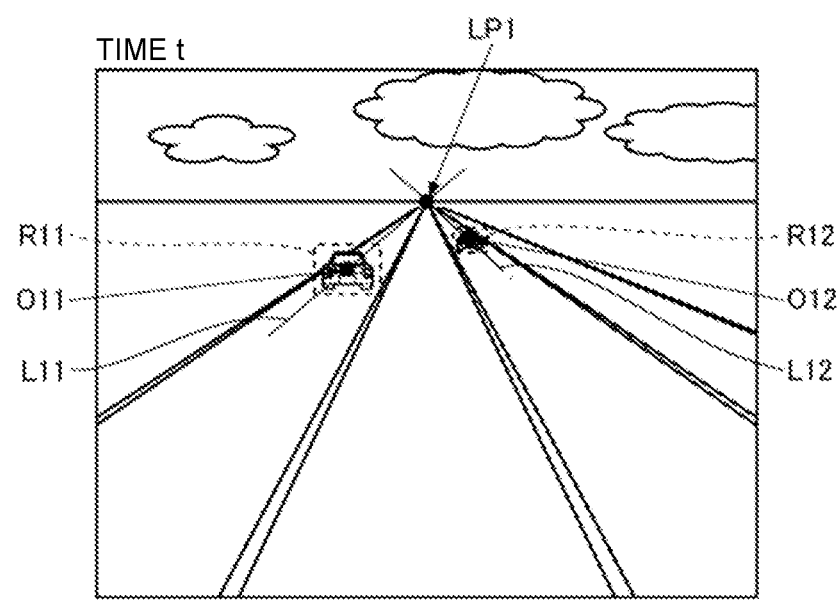
FIG. 21 is a diagram (part 2) for explaining the motion vector search operation according to an embodiment.
Figure 22:
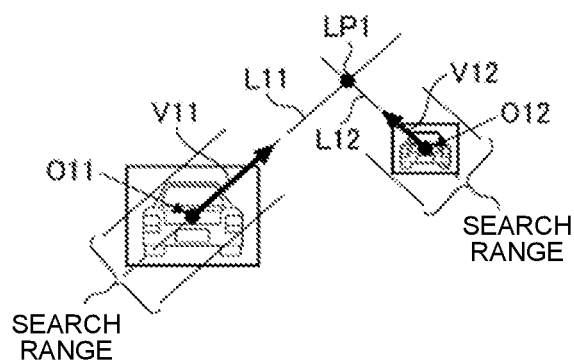
FIG. 22 is a diagram (part 3) for explaining the motion vector search operation according to an embodiment.

FIGS. 20 to 22 are diagrams for explaining a motion vector search operation according to the present embodiment. Note that FIG. 20 illustrates frame data at time t−1 (this is referred to as a previous frame), and FIG. 21 illustrates frame data at time t (this is referred to as a current frame). FIG. 22 is a diagram for explaining a search range of a motion vector for the current frame.

As illustrated in FIG. 20, when motion vectors V01 and V02 of two or more regions of interest (corresponding to a bounding box or a region used for block matching in optical flow calculation) R01 and R02 in the image are obtained with respect to the previous frame at time t−1, the position of a vanishing point LP0 in the previous frame is identified based on the intersection of extension lines L01 and L02 of the motion vectors V01 and V02. Note that, when there are three or more motion vectors, a barycentric position of the intersection, a center of the distribution range, or the like may be determined as the vanishing point.

The position of the vanishing point LP0 of the previous frame specified in this manner is set as, for example, the position of the vanishing point LP1 of the current frame (time t) which is the next frame. In the present embodiment, straight lines L11 and L12 connecting the vanishing point LP1 and center points O11 and O12 of regions of interest R11 and R12 in the current frame are set.

When the straight lines L11 and L12 connecting the vanishing point LP1 and the center points O11 and O12, respectively, are set in this manner, as illustrated in FIG. 22, the search ranges of the motion vectors of the regions of interest R11 and R12 are determined on the basis of the straight lines L11 and L12, respectively. Specifically, a search range is set based on the straight lines L01 and L02 obtained by projecting the straight lines L11 and L12 onto the same coordinates on the previous frame, and a region corresponding to each of the regions of interest R11 and R12 is searched within the range, thereby calculating the motion vectors V11 and V12 of the regions R11 and R12. Note that a width of the search range may be determined, for example, on the basis of the maximum value of the predicted motion vector or the like (the maximum scalar value of the motion vector or the like).

In addition, for example, the width of the search range may be set on the basis of a predicted calculation amount (For example, a restriction is placed on the calculation amount that can occur, and the search range is narrowed so as not to exceed the calculation amount), may be set on the basis of an installation position (for example, the front, the side, or the like of the vehicle 1) of the camera, may be set on the basis of a distance (For example, the farther the object is, the narrower the search range can be.) to an object included in the region of interest, or may be set on the basis of information (For example, the search range can be narrowed as the vehicle speed is slower.) such as a vehicle speed. However, the present invention is not limited thereto, and the width of the search range may be determined on the basis of various parameters.

However, the position of the vanishing point LP1 in the current frame is not limited to the position of the vanishing point LP0 in the previous frame (corresponding to the above-described previous frame) with respect to the current frame, and may be determined on the basis of the positions of the vanishing points in two or more frames before the current frame. For example, the position of the vanishing point in the current frame may be determined or estimated on the basis of the movement amount and the direction of the position of the vanishing point in two or more frames before the current frame.

Furthermore, the position of the vanishing point also changes depending on the traveling direction of the vehicle 1, the steering situation, and the like. Therefore, the position of the vanishing point LP1 in the current frame may be estimated in consideration of the traveling direction and the steering situation of the vehicle 1. For example, when the vehicle 1 is turning left, the position of the vanishing point in the frame data shifts to the left in the image. Therefore, the position of the vanishing point in the current frame may be estimated based on the position of the vanishing point determined in the previous frame and the turning direction, the turning radius, and the like of the vehicle 1.

Figure 23:
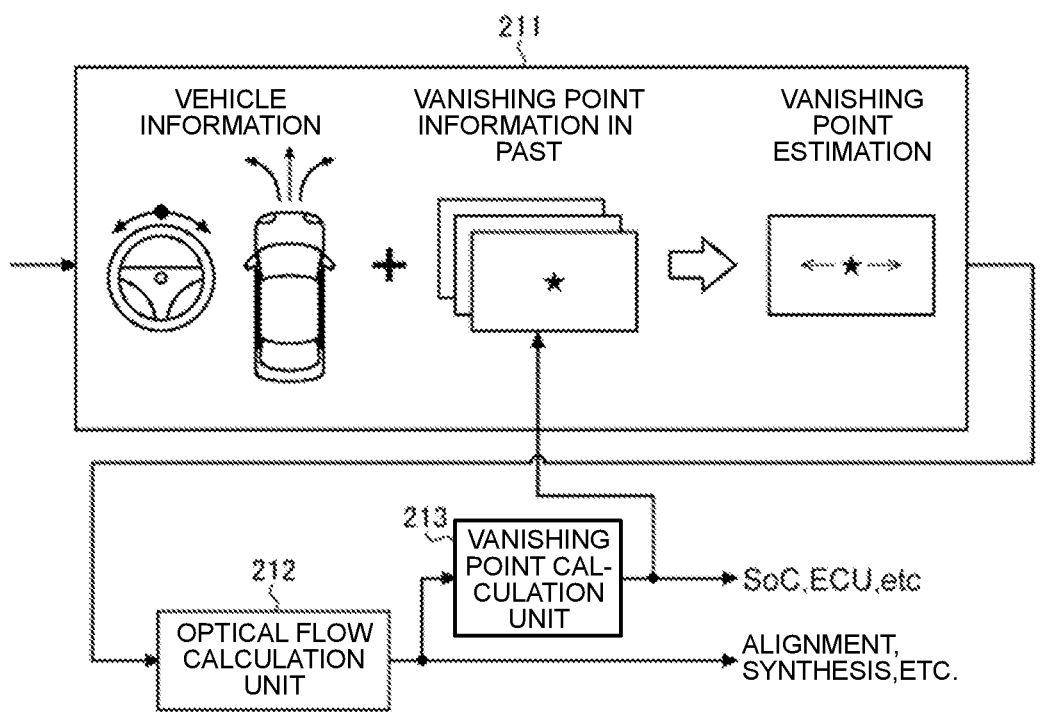
FIG. 23 is a block diagram illustrating a configuration example for realizing estimation of a vanishing point and search for a motion vector according to an embodiment.

FIG. 23 is a block diagram illustrating a configuration example for realizing estimation of a vanishing point and search for a motion vector according to the present embodiment. As illustrated in FIG. 23, the configuration for realizing estimation of a vanishing point and search for a motion vector according to the present embodiment includes, for example, a vanishing point position estimation unit 211, an optical flow calculation unit 212, and a vanishing point calculation unit 213. Note that the configuration for realizing the motion vector search may be realized by, for example, the signal processing unit 108 in FIG. 3, or may be realized by another unit such as the travel assistance/automatic driving control unit 29 (see FIG. 1).

The vanishing point position estimation unit 211 estimates a position of the vanishing point in the current frame based on, for example, vehicle information of the vehicle 1 similarly input to the input current frame and vanishing point information (hereinafter, referred to as past vanishing point information.) specified in one or more previous frames. Note that the vehicle information can include, for example, at least one of odometry information such as a steering angle (a rotation angle of a steering wheel or the like), a detection result of the IMU, vehicle body information (a total length, a vehicle width, a vehicle height), a camera installation position, a posture thereof, a vehicle speed, operation information of a direction indicator, and the like. Furthermore, the past vanishing point information may be held in a memory or the like (for example, the data storage unit 109) not illustrated in the vanishing point position estimation unit 211.

The information on the position of the vanishing point estimated by the vanishing point position estimation unit 211 is input to the optical flow calculation unit 212 together with the frame data of the current frame. For example, the optical flow calculation unit 212 calculates a motion vector (optical flow) for the current frame by the method described above with reference to FIGS. 20 to 22. Then, the optical flow calculation unit 212 inputs the calculated motion vector to the vanishing point calculation unit 213.

The vanishing point calculation unit 213 specifies the position of the vanishing point in the current frame on the basis of the motion vector input from the optical flow calculation unit 212. For example, as described above, the vanishing point calculation unit 213 specifies the position of the vanishing point in the current frame on the basis of the intersection of the extended lines of the motion vectors calculated for the current frame. The position of the vanishing point specified in this manner is input to the vanishing point position estimation unit 211 and used for position estimation of the vanishing point in the next frame. Furthermore, the position of the specified vanishing point may be output to the outside such as the travel assistance/automatic driving control unit 29 together with the frame data of the current frame, for example.

Note that the region of interest that is the target of the motion vector search may be determined by region determination (for example, region determination and the like executed at the time of noise reduction in the signal processing unit 108, region determination and the like such as other object recognition, and the like) for the frame data, but is not limited thereto. For example, in a case where the camera 51 includes an image sensor having an image plane phase difference detection region, the frame data may be segmented on the basis of the image plane phase difference, and the region determined by the segmentation may be determined as a region of interest.

Furthermore, in the search of the motion vector for the region of interest, in a case where distance information to the subject can be acquired by the ZAF, the radar 52, the LiDAR 53, the ultrasonic sensor 54, or the like, the motion vector may be estimated on the basis of the distance information acquired by these.

1.10 Summary

As described above, according to the present embodiment, for example, a high-resolution image is acquired for a region (ROI) for which high resolution is required in processing such as image authentication, and an image with a necessary and sufficient resolution (In this example, this is referred to as low resolution.) is acquired for other regions. Therefore, the data amount of image data can be accurately reduced. This makes it possible to suppress an increase in cost, an increase in processing time, and the like.

2. Hardware Configuration

Figure 24:
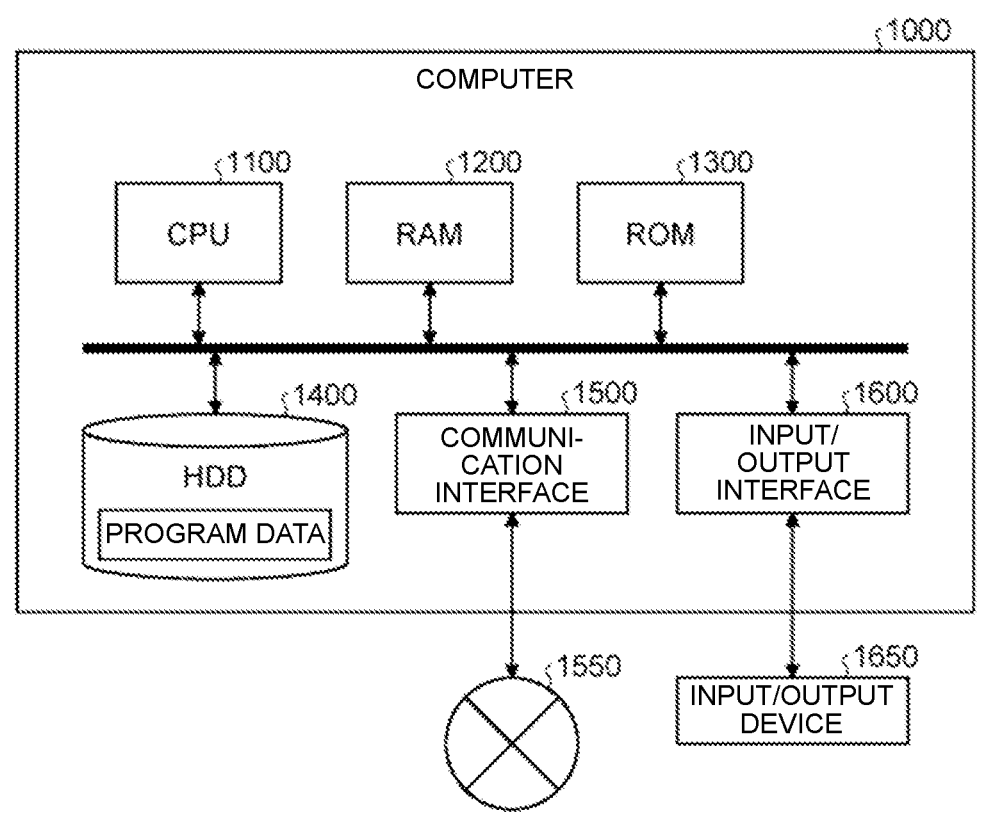
FIG. 24 is a hardware configuration diagram illustrating an example of a computer that implements functions of an information processing device according to the present disclosure.

The recognition unit 120 according to the embodiment, the modification examples thereof, and the application examples described above can be realized by a computer 1000 having a configuration as illustrated in FIG. 24, for example. FIG. 24 is a hardware configuration diagram illustrating an example of the computer 1000 that implements the functions of the information processing device constituting the recognition unit 120. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 operates on the basis of a program stored in the ROM 1300 or the HDD 1400, and controls each unit. For example, the CPU 1100 develops a program stored in the ROM 1300 or the HDD 1400 in the RAM 1200, and executes processing corresponding to various programs.

The ROM 1300 stores a boot program such as a basic input output system (BIOS) executed by the CPU 1100 when the computer 1000 is activated, a program depending on hardware of the computer 1000, and the like.

The HDD 1400 is a computer-readable recording medium that non-transiently records a program executed by the CPU 1100, data used by the program, and the like. Specifically, the HDD 1400 is a recording medium that records a projection control program according to the present disclosure as an example of program data 1450.

The communication interface 1500 is an interface for the computer 1000 to connect to an external network 1550 (for example, the Internet). For example, the CPU 1100 receives data from another device or transmits data generated by the CPU 1100 to another device via the communication interface 1500.

The input/output interface 1600 has a configuration including the I/F unit 18 described above, and is an interface for connecting an input/output device 1650 and the computer 1000. For example, the CPU 1100 receives data from an input device such as a keyboard and a mouse via the input/output interface 1600. Furthermore, the CPU 1100 transmits data to an output device such as a display, a speaker, or a printer via the input/output interface 1600. Furthermore, the input/output interface 1600 may function as a media interface that reads a program or the like recorded in a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, the CPU 1100 of the computer 1000 functions as the recognition unit 120 according to the above-described embodiment by executing a program loaded on the RAM 1200. Furthermore, the HDD 1400 stores a program and the like according to the present disclosure. Note that the CPU 1100 reads the program data 1450 from the HDD 1400 and executes the program data 1450, but as another example, these programs may be acquired from another device via the external network 1550.

Although the embodiments of the present disclosure have been described above, the technical scope of the present disclosure is not limited to the above-described embodiments as it is, and various modifications can be made without departing from the gist of the present disclosure. Furthermore, components of different embodiments and modification examples may be appropriately combined.

Furthermore, the effects of each embodiment described in the present specification are merely examples and are not limited, and other effects may be provided.

Note that the present technique can also have the following configurations.

(1)
An imaging device including:
  a determination unit that determines two or more regions including a first region and a second region with respect to an imaging region of an imaging unit based on a degree of focus of an image acquired by the imaging unit; and
  a processing unit that generates a first image based on the first region and a second image based on the second region,
  wherein the first image has a higher resolution than the second image.

(2)
The imaging device according to (1), wherein
the determination unit determines the degree of focus based on a size of a pixel in the imaging region and a size of a circle of confusion formed in the imaging region.

(3)
The imaging device according to (1), wherein
the imaging unit includes a plurality of image plane phase difference pixels capable of detecting an image plane phase difference of an image formed in the imaging region, and
the determination unit determines the two or more regions including the first region and the second region based on the image plane phase difference detected by the plurality of image plane phase difference pixels.

(4)
The imaging device according to (3), wherein
the determination unit determines the two or more regions including the first region and the second region by calculating a defocus amount of the image based on the image plane phase difference.

(5)
The imaging device according to (1), wherein
the determination unit determines the two or more regions including the first region and the second region by comparing the image with an image obtained by smoothing the image.

(6)
The imaging device according to any one of (1) to (5), wherein
the first region is a region including an object located farther than a distance from the imaging unit of an object included in the second region.

(7)
The imaging device according to any one of (1) to (6), further including
an optical system disposed with respect to the imaging region of the imaging unit,
wherein an in-focus position of the optical system is set at a predetermined distance or more away from the imaging unit.

(8)
The imaging device according to (7), wherein
the in-focus position is near infinity of the optical system.

(9)
The imaging device according to (7), wherein
the in-focus position is a position farther than infinity of the optical system.

(10)
The imaging device according to any one of (7) to (9), wherein
a position of the optical system with respect to the imaging region is adjusted such that a Near end of a permissible circle of confusion formed in the imaging region via the optical system is located at a boundary for switching between the first region and the second region.

(11)
The imaging device according to any one of (7) to (10), wherein
the determination unit determines, as the first region, a region in which a circle of confusion formed by the optical system in the imaging region is smaller than a size of a pixel in the imaging region.

(12)
The imaging device according to any one of (1) to (11), wherein
the processing unit generates third image data by integrating the first image and the second image.

(13)
The imaging device according to any one of (1) to (12), wherein
the processing unit generates the first image by executing remosaic on image data read from the first region in the imaging region.

(14)
The imaging device according to any one of (1) to (13), wherein
the processing unit generates the second image by executing binning on pixels of image data read from the second region in the imaging region.

(15)
The imaging device according to any one of (1) to (13), further including
a control unit that executes a readout operation for the imaging unit,
wherein the control unit reads the second image by executing binning on pixels included in the second region.

(16)
An image processing method including:
  determining two or more regions including a first region and a second region with respect to an imaging region of an imaging unit based on a degree of focus of an image acquired by the imaging unit; and
  generating a first image based on the first region and a second image based on the second region,
  wherein the first image has a higher resolution than the second image.

(17)
An image processing program for causing a processor mounted on an image processing device to function, the image processing program causing the processor to execute:
  a step of determining two or more regions including a first region and a second region with respect to an imaging region of an imaging unit based on a degree of focus of an image acquired by the imaging unit; and
  a step of generating a first image based on the first region and a second image based on the second region,
  wherein the first image has a higher resolution than the second image.

REFERENCE SIGNS LIST

100 IMAGE SENSOR
101 PIXEL ARRAY UNIT
102 VERTICAL DRIVE CIRCUIT
103 COLUMN PROCESSING CIRCUIT
104 HORIZONTAL DRIVE CIRCUIT
105 SYSTEM CONTROL UNIT
106 CONTROL UNIT

108 SIGNAL PROCESSING UNIT
109 DATA STORAGE UNIT
110 PIXEL
111a, 111b IMAGE PLANE PHASE DIFFERENCE PIXEL
112 IMAGE PLANE PHASE DIFFERENCE DETECTION REGION
112a, 113a, 113b, 113c REGION
114 CENTER
120 RECOGNITION UNIT
181 DEFOCUS AMOUNT CALCULATION UNIT
182 AREA DETECTION UNIT
211 VANISHING POINT POSITION ESTIMATION UNIT
212 OPTICAL FLOW CALCULATION UNIT
213 VANISHING POINT CALCULATION UNIT
1821 CONVERSION UNIT
1822 BUFFER UNIT
1823, 1825 EDGE EXTRACTION UNIT
1824 SMOOTHING UNIT
1826 COMPARISON UNIT

The invention claimed is:

1. An imaging device, including:
circuitry configured to:
determine two or more regions with respect to an imaging region of an imaging unit, wherein
the two or more regions include a first region and a second region,
the determination of the two or more regions is based on a degree of focus of an image acquired by the imaging unit,
the first region is an in-focus region of the image acquired by the imaging unit, and
the second region is a de-focus region of the image acquired by the imaging unit;
generate first image data based on the first region; and
generate second image data based on the second region, wherein a resolution of the first image data is higher than a resolution of the second image data.

2. The imaging device according to claim 1, wherein the circuitry is further configured to determine the degree of focus, based on a size of a pixel in the imaging region and a size of a circle of confusion in the imaging region.

3. The imaging device according to claim 1, wherein the imaging unit includes a plurality of image plane phase difference pixels,
the plurality of image plane phase difference pixels detects an image plane phase difference of an image formed in the imaging region, and
the circuitry is further configured to determine the two or more regions based on the image plane phase difference detected by the plurality of image plane phase difference pixels.

4. The imaging device according to claim 3, wherein the circuitry is further configured to:
calculate a defocus amount of the image formed in the imaging region, wherein the calculation of the defocus amount is based on the image plane phase difference; and
determine the two or more regions based on the calculated defocus amount of the image formed in the imaging region.

5. The imaging device according to claim 1, wherein the circuitry is further configured to:
perform a smoothing operation on the image acquired by the imaging unit;
generate a smoothed image based on the smoothing operation performed on the image acquired by the imaging unit;
compare the image acquired by the imaging unit with the smoothed image; and
determine the two or more regions based on the comparison.

6. The imaging device according to claim 1, wherein
the first region includes a first object,
the second region includes a second object, and
a distance of the first object from the imaging unit is farther than a distance of the second object from the imaging unit.

7. The imaging device according to claim 1, further including
an optical system arranged with respect to the imaging region of the imaging unit, wherein
an in-focus position of the optical system is at a specific distance or more away from the imaging unit.

8. The imaging device according to claim 7, wherein the in-focus position is near infinity of the optical system.

9. The imaging device according to claim 7, wherein the in-focus position is a position farther than infinity of the optical system.

10. The imaging device according to claim 7, wherein
the circuitry is further configured to adjust a position of the optical system with respect to the imaging region, and
based on the adjusted position, a Near end of a permissible circle of confusion in the imaging region is located at a boundary for between the first region and the second region.

11. The imaging device according to claim 7, wherein
the circuitry is further configured to determine, as the first region, a region in which a circle of confusion in the imaging region is smaller than a size of a pixel in the imaging region.

12. The imaging device according to claim 1, wherein the circuitry is further configured to:
integrate the first image data and the second image data; and
generate third image data based on the integration of the first image data and the second image data.

13. The imaging device according to claim 1, wherein the circuitry is further configured to:
read image data from the first region in the imaging region;
execute remosaic on the image data read from the first region in the imaging region; and
generate the first image data based on the remosaic executed on the image data read from the first region in the imaging region.

14. The imaging device according to claim 1, wherein the circuitry is further configured to:
read image data from the second region in the imaging region;
execute a binning operation on pixels of the image data read from the second region in the imaging region; and
generate the second image data based on the binning operation executed on the pixels of the image data read from the second region in the imaging region.

15. The imaging device according to claim 1, wherein the circuitry is further configured to:
execute a readout operation for the imaging unit;
execute a binning operation on pixels included in the second region; and read the second image by executing data based on the binning operation executed on the pixels included in the second region.

16. An image processing method, including:
   determining two or more regions with respect to an imaging region of an imaging unit, wherein
      the two or more regions include a first region and a second region,
      the determination of the two or more regions is based on a degree of focus of an image acquired by the imaging unit,
      the first region is an in-focus region of the image acquired by the imaging unit, and
      the second region is a de-focus region of the image acquired by the imaging unit;
   generating first image data based on the first region; and
   generating second image data based on the second region,
      wherein a resolution of the first image data is higher than a resolution of the second image data.

17. A non-transitory computer-readable medium having stored thereon computer-executable instructions that, when executed by a computer, cause the computer to execute operations, the operations comprising:
   determining two or more regions with respect to an imaging region of an imaging unit, wherein
      the two or more regions include a first region and a second region,
      the determination of the two or more regions is based on a degree of focus of an image acquired by the imaging unit,
      the first region is an in-focus region of the image acquired by the imaging unit, and
      the second region is a de-focus region of the image acquired by the imaging unit;
   generating first image data based on the first region; and
   generating second image data based on the second region,
      wherein a resolution of the first image data is higher than a resolution of the second image data.

* * * * *